(12) United States Patent
Park et al.

(10) Patent No.: US 12,528,037 B2
(45) Date of Patent: Jan. 20, 2026

(54) WATER PURIFIER AND CONTROL METHOD THEREFOR

(71) Applicant: SAMSUNG ELECTRONICS CO., LTD., Suwon-si (KR)

(72) Inventors: Jungha Park, Suwon-si (KR); Junggeun Lee, Suwon-si (KR); Jongho Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 690 days.

(21) Appl. No.: 17/946,550

(22) Filed: Sep. 16, 2022

(65) Prior Publication Data
US 2023/0020461 A1 Jan. 19, 2023

Related U.S. Application Data

(63) Continuation of application No. PCT/KR2021/003170, filed on Mar. 15, 2021.

(30) Foreign Application Priority Data

Mar. 17, 2020 (KR) .................. 10-2020-0032483

(51) Int. Cl.
B01D 37/04 (2006.01)
B01D 35/02 (2006.01)
(Continued)

(52) U.S. Cl.
CPC .......... B01D 37/043 (2013.01); B01D 35/02 (2013.01); C02F 1/001 (2013.01); C02F 1/008 (2013.01);
(Continued)

(58) Field of Classification Search
None
See application file for complete search history.

(56) References Cited

U.S. PATENT DOCUMENTS 6,478,950 B1 * 11/2002 Peat ..................... G01N 27/38
204/402
2002/0104800 A1 8/2002 Collins et al.
(Continued)

FOREIGN PATENT DOCUMENTS

KR 10-2010-0074139 A 7/2010
KR 10-1378848 B1 3/2014
(Continued)

OTHER PUBLICATIONS

International Search Report dated Jun. 25, 2021 in PCT Application No. PCT/KR2021/003170.
(Continued)

Primary Examiner — Richard C Gurtowski
(74) Attorney, Agent, or Firm — STAAS & HALSEY LLP

(57) ABSTRACT

A water purifier includes: a raw water flow path; a purified water flow path connected to the raw water flow path; at least one filter provided in the purified water flow path and to filter raw water flowing along the purified water flow path; a washing water flow path connected to the raw water flow path; a washing water generator configured to electrolyze the raw water to generate washing water; an optical sensor to output a value according to a degree of generation of bubbles included in the washing water; and a controller to control the washing water generator and at least one valve provided in at least one of the raw water flow path, the purified water flow path, and the washing water flow path to perform a washing operation, and identify whether an error has occurred in the washing operation based on an output from the optical sensor.

20 Claims, 16 Drawing Sheets

(51) Int. Cl.
*C02F 1/00* (2023.01)
*C02F 1/467* (2023.01)
*C02F 9/00* (2023.01)

(52) U.S. Cl.
CPC ............... *C02F 1/467* (2013.01); *C02F 9/00* (2013.01); *C02F 2201/005* (2013.01); *C02F 2209/40* (2013.01)

(56) References Cited

U.S. PATENT DOCUMENTS

| | | | | |
|---|---|---|---|---|
| 2005/0139530 | A1* | 6/2005 | Heiss | C02F 9/00 210/257.2 |
| 2007/0119759 | A1* | 5/2007 | Duplessis | C02F 9/20 210/85 |
| 2009/0033700 | A1* | 2/2009 | Kusumoto | B41J 2/175 347/12 |
| 2010/0051477 | A1* | 3/2010 | Jeon | C02F 1/4672 204/228.2 |
| 2010/0204924 | A1* | 8/2010 | Wolfe | C02F 1/008 702/188 |
| 2014/0377410 | A1* | 12/2014 | Zhang | C02F 1/008 426/66 |

FOREIGN PATENT DOCUMENTS

| | | |
|---|---|---|
| KR | 10-1564265 B1 | 10/2015 |
| KR | 10-2016-0116142 A | 10/2016 |
| KR | 10-2017-0004395 A | 1/2017 |
| KR | 10-2017-0013749 | 2/2017 |
| KR | 10-1726303 B1 | 4/2017 |
| KR | 10-1734194 B1 | 5/2017 |
| KR | 10-2018-0076120 A | 7/2018 |
| KR | 10-1916882 B1 | 11/2018 |
| KR | 10-2019-0004531 | 1/2019 |
| KR | 10-1944884 B1 | 2/2019 |

OTHER PUBLICATIONS

Korean Office Action dated Apr. 30, 2025 for Korean Application No. 10-2020-0032483.

* cited by examiner

WATER PURIFIER AND CONTROL METHOD THEREFOR

CROSS-REFERENCE TO RELATED APPLICATIONS

This application is a continuation application, under 35 U.S.C. § 111(a), of International Patent Application No. PCT/KR2021/003170, filed on Mar. 15, 2021, which claims the benefit of Korean Patent Application No. 10-2020-0032483, filed Mar. 17, 2020, in the Korean Intellectual Property Office, the entire disclosure of which is incorporated herein by reference as a part of this application.

BACKGROUND

Field

The present disclosure relates to a water purifier having an automatic cleaning function and a control method thereof.

Description of Related Art

A water purifier is an apparatus for filtering raw water supplied from the outside to provide drinking water to users. For this, the water purifier includes components, such as at least one filter for filtering raw water, a plurality of tubes through which raw water, purified water, or washing water flows, valves for controlling the flow of the raw water, purified water, or washing water, etc.

However, when the water purifier is used for a long time, foreign materials are caught in the tubes or valves or microorganisms are formed and attached on the inner walls of the tubes or valves to interrupt the smooth flow of raw water or purified water. As a result, the water purifier provides polluted water to users.

Accordingly, most of water purifiers use a method of cleaning components by generating washing water and causing the washing water to flow through the tubes.

SUMMARY

A water purifier according to an embodiment includes: a raw water flow path through which raw water to be flowed; a purified water flow path connected to the raw water flow path and through which the raw water from the raw water flow path to be flowed; at least one filter provided in the purified water flow path and configured to filter raw water flowing along the purified water flow path; a washing water flow path connected to the raw water flow path and through which the raw water from the raw water flow path to be flowed; a washing water generator provided in the washing water path and configured to electrolyze the raw water flowing along the washing water flow path to generate washing water including a sterilizing material; at least one valve provided in at least one of the raw water flow path, the purified water flow path, and the washing water flow path; an optical sensor provided at a discharging end of the washing water generator and configured to sense a degree of generation of bubbles included in the generated washing water and output a value corresponding to the sensed degree of generation of bubbles; and a controller configured to selectively connecting the raw water flow path to one of the washing water flow path or the purified water flow path based on a washing operation perform the washing operation by controlling the washing water generator and the at least one valve, and identify whether an error has occurred in the washing operation based on an output from the optical sensor.

The water purifier may further include a display provided on an outer side of the water purifier, wherein the controller may be further configured to control, in response to identifying that the error has occurred in the washing operation, the display to display information related to the error.

The water purifier may further include a speaker, wherein the controller may be further configured to control, in response to identifying that the error has occurred in the washing operation, the speaker to output information related to the error.

The water purifier may further include a communicator, wherein the controller may be further configured to control, in response to identifying that the error has occurred in the washing operation, the communicator to transmit information related to the error to an external server or an external device that manages the water purifier.

The water purifier may further include a current sensor configured to detect current applied to the washing water generator, wherein the controller may be further configured to identify whether an error has occurred in the washing operation, based on an output from the optical sensor and an output from the current sensor.

The controller may be further configured to identify that the washing water generator does not normally operate, in response to identifying that the output from the optical sensor does not correspond to the output from the current sensor.

The controller may be further configured to perform a rinsing operation by controlling at least one valve provided in at least one of the raw water flow path, the purified water flow path, or the washing water flow path, when a preset time has elapsed after the washing operation is performed.

The controller may be further configured to identify whether to finish the rising operation, based on an output from the optical sensor after the rinsing operation is performed.

The water purifier may further include a microorganism sensor, wherein the controller may be further configured to identify whether an additional washing operation needs to be performed, based on an output from the microorganism sensor.

The water purifier may further include a discharge flow path connected to the washing water flow path and the purified water flow path; and a drain flow path connected to the discharge flow path, and the optical sensor may be provided in at least one of the washing water flow path, the discharge flow path, or the drain flow path.

The water purifier may further include a discharge flow path connected to the washing water flow path and the purified water flow path; and a drain flow path connected to the discharge flow path, and the microorganism sensor may be provided in at least one of the discharge flow path or the drain flow path.

The controller may be further configured to gradually increase a voltage that is applied to the washing water generator to adjust an output from the optical sensor to reach a target value, according to an identification that an error has occurred in the washing operation.

The controller may be further configured to increase an execution time of the washing operation in response to identifying that an error has occurred in the washing operation.

A method for controlling a water purifier, according to an embodiment, includes: opening at least one valve used to perform a washing operation of the water purifier; turning on a washing water generator configured to generate washing water; sensing, by an optical sensor, a degree of generation of bubbles included in the generated washing water; and identifying whether an error has occurred in the washing operation, based on an output from the optical sensor.

The method may further include displaying information related to the error on a display provided on an outer side of the water purifier, in response to identifying that the error has occurred in the washing operation.

The method may further include outputting information related to the error through a speaker provided on an outer side of the water purifier, in response to identifying that the error has occurred in the washing operation.

The method may further include transmitting information related to the error to an external server or an external device that manages the water purifier, through a communicator, in response to identifying that the error has occurred in the washing operation.

The method may further include: sensing current applied to the washing water generator by using a current sensor; and identifying whether an error has occurred in the washing operation, based on an output from the optical sensor and an output from the current sensor.

The identifying of whether the error has occurred in the washing operation may include identifying that the washing water generator does not normally operate, in response to identifying that the output from the optical sensor does not correspond to the output from the current sensor.

The method may further include performing a rinsing operation by controlling at least one valve provided in at least one of the raw water flow path, the purified water flow path, or the washing water flow path, when a preset time has elapsed after the washing operation is performed.

The method may further include identifying whether to finish the rising operation, based on an output from the optical sensor after the rinsing operation is performed.

The method may further include sensing microorganisms included in rinsing water by using a microorganism sensor, and identifying whether an additional washing operation needs to be performed, based on an output from the microorganism sensor.

The method may further include gradually increasing a voltage that is applied to the washing water generator to adjust the output from the optical sensor to reach a target value, in response to identifying that an error has occurred in the washing operation.

The method may further include increasing an execution time of the washing operation in response to identifying that an error has occurred in the washing operation.

DETAILED DESCRIPTION

Figure 1:
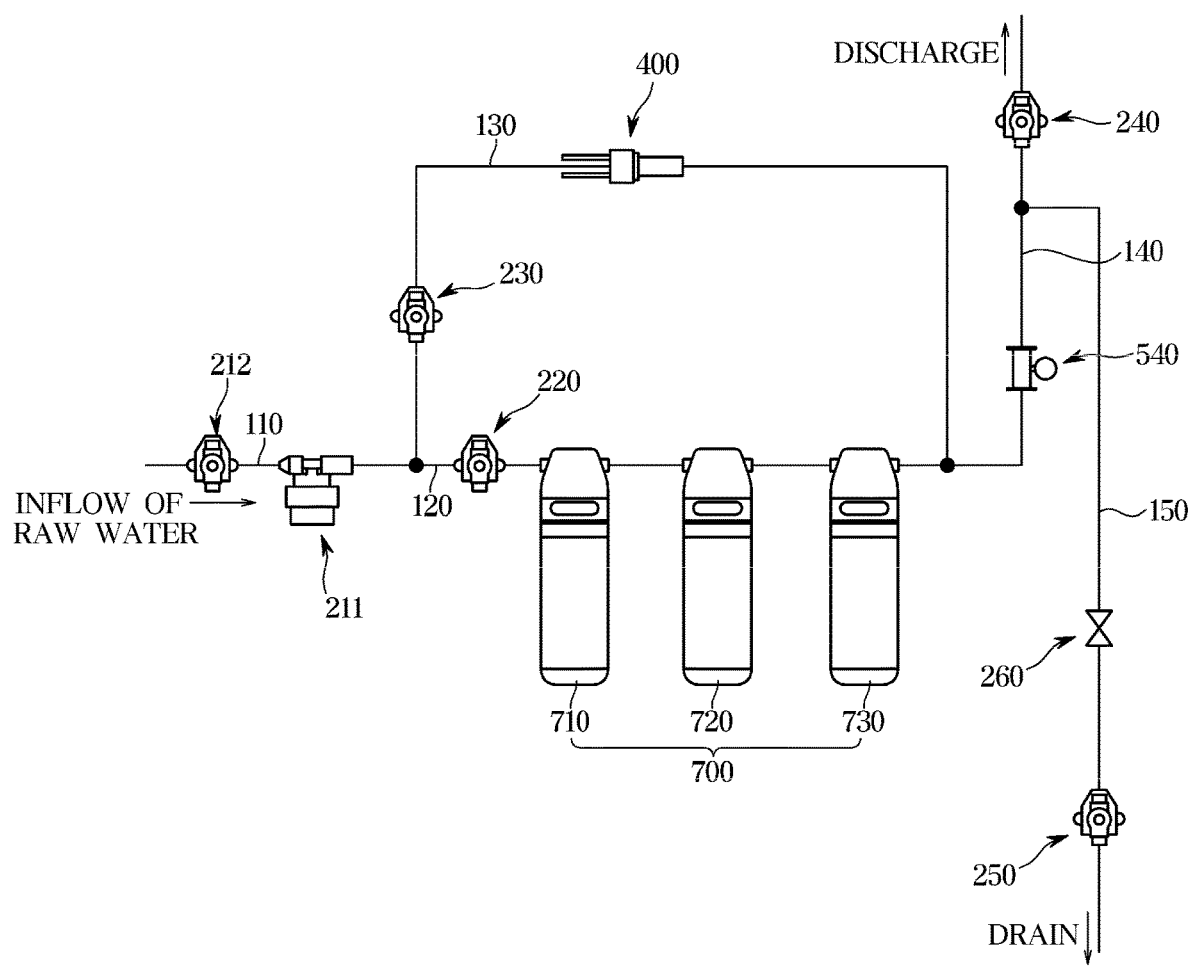
FIG. 1 is a water supply diagram showing a flow of water in a water purifier according to an embodiment.

Like reference numerals will refer to like components throughout this specification. This specification does not describe all components of the embodiments, and general information in the technical field to which the present disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it can be directly or indirectly connected to the other part. When a part is indirectly connected to another part, it may be connected to the other part through a wireless communication network.

Also, it will be understood that when a certain part "includes" a certain component, the part does not exclude another component but can further include another component, unless the context clearly dictates otherwise.

In the entire specification, it will also be understood that when an element is referred to as being "on" or "over" another element, it can be directly on the other element or intervening elements may also be present.

In the entire specification, it will also be understood that when a certain component transfers or transmits a signal or data to another component, a case in which another component is present between the corresponding component and the other component and the corresponding component transfers or transmits the signal or data through the other component is not exclusive, unless the context clearly dictates otherwise.

In the entire specification, the ordinal terms "first", "second", etc. are used to distinguish a plurality of components from each other, without representing an arrangement order of the components, a manufacturing order of the components, importance of the components, etc.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, a water purifier and a control method thereof, according to an aspect, will be described in detail with reference to the accompanying drawings.

FIG. 1 is a water supply diagram showing a flow of water in a water purifier according to an embodiment.

Referring to FIG. 1, a water purifier 1 may include a raw water flow path 110 which raw water such as tap water from outside enters, and a purified water flow path 120 and a washing water flow path 130 connected to the raw water flow path 110. The flow paths provided in the water purifier 1 may be formed by a plurality of tubes.

At least one of the purified water flow path 120 or the washing water flow path 130 may diverge from the raw water flow path 110. For example, the purified water flow path 120 may be integrated into the raw water flow path 110, and the washing water flow path 130 may diverge from the raw water flow path 110.

In the raw water flow path 110, a pressure reducing valve 211 for reducing pressure of raw water and a raw water valve 212 for receiving or blocking raw water may be provided. In the purified water flow path 120, a purified water valve 220 for receiving or blocking raw water from the raw water flow path 110 may be provided. In the washing water flow path 130, a washing water valve 230 for receiving or blocking raw water from the raw water flow path 110 may be provided.

In the purified water flow path 120, at least one filter 700 for filtering raw water may be provided. In the current example, a plurality of filters 710, 720, and 730 may be provided, wherein the plurality of filters 710, 720, and 730 may include a pre-carbon filter 710 for adsorbing volatile materials, such as chlorine, chlorine byproducts, etc., from raw water, a membrane filter 720 for filtering pollutant having very small sizes with a micro pore size, and a post-carbon filter 730 for influencing taste of purified water to be discharged.

Also, a sediment filter for filtering sediment included in raw water or a high-turbidity filter for filtering relatively large particles may be further positioned before a location at which the washing water flow path 130 diverges from the raw water flow path 110.

The above description about the kind of the filter 700 relates to an example that is applicable to an embodiment of the water purifier 1, and an embodiment of the water purifier 1 is not limited to the above-described example. Accordingly, different kinds of filters may be provided at different locations by different numbers, unlike the above-described example.

In the washing water flow path 130, a washing water generator 400 for generating washing water may be provided. For example, the washing water generator 400 may be implemented as an electrolyzer for electrolyzing water to generate a sterilizing material.

The washing water generator 400 implemented as an electrolyzer may include a plurality of plate electrodes. According to application of a voltage to the plurality of plate electrodes, current may flow between the plurality of plate electrodes, and chlorine included in water flowing between the plurality of plate electrodes may be electrolyzed to generate a sterilizing material having sterilizing power. For example, hypochlorous acid may be generated as the sterilizing material.

The washing water flow path 130 may be again connected to the purified water flow path 120 at a rear end of the filter 700 provided in the purified water flow path 120, that is, at downstream of the purified water flow path 120. A discharge flow path 140 may be formed from a location where the washing water flow path 130 is again connected to the purified water flow path 120. At a downstream end of the discharge flow path 140, a discharge nozzle (not shown) for providing drinking water to a user may be formed.

Meanwhile, in embodiments of the water purifier 1, upstream, downstream, a front end, and a rear end may be defined based on a direction in which water entered the water purifier 1 flows. A side being close to a direction in which raw water enters from the outside may be upstream or a front end, and a side being close to a direction in which water is discharged or drained to the outside may be downstream or a rear end.

In the current embodiment, a structure in which the washing water flow path 130 bypasses the purified water flow path 120 to be separated from the purified water flow path 120 has been described as an example. However, an embodiment of the water purifier 1 is not limited to the structure. The washing water generator 400 may be positioned downward of the purified water flow path 120, and the washing water flow path 130 and the purified water flow path 120 may be provided on the same line. In this case, in a purifying mode, the washing water generator 400 may be turned off, and purified water filtered by the filter 700 may be supplied to a user via the washing water flow path 130 and the discharge flow path 140. In a cleaning mode, the washing water generator 400 may be turned on to electrolyze purified water and generate washing water.

In the discharge flow path 140, a discharge valve 240 for adjusting a flow of washing water or purified water may be provided, and a flow meter 540 may be provided upstream of the discharge valve 240. By opening the discharge valve 240, purified water filtered by the filter 700 or washing water generated by the washing water generator 400 may be discharged to the outside through the discharge nozzle provided at the downstream end of the discharge flow path 140.

A drain flow path 150 may be connected to the discharge flow path 140 at downstream of the discharge flow path 140. In the drain flow path 150, a drain valve 250 for adjusting a flow of washing water or purified water and a check valve 260 for preventing a back flow of washing water or purified water may be provided. The drain flow path 250 may diverge from the discharge flow path 140, and by opening the drain valve 250, washing water or purified water flowing along the discharge flow path 140 may enter the drain flow path 150 and then be discharged to the outside through a drain of the water purifier 1, formed at one end of the drain flow path 150.

Meanwhile, the water purifier 1 according to an embodiment may further include a hot and cold water supplier for providing cold water or hot water, and the hot and cold water supplier may include a heat exchanger. The hot and cold water supplier may be provided downstream of the discharge flow path 140.

The water purifier 1 according to an embodiment may operate in a purifying mode for filtering raw water and supplying purified water, and a cleaning mode for generating washing water to wash various flow paths and valves of the water purifier 1.

Figure 2:
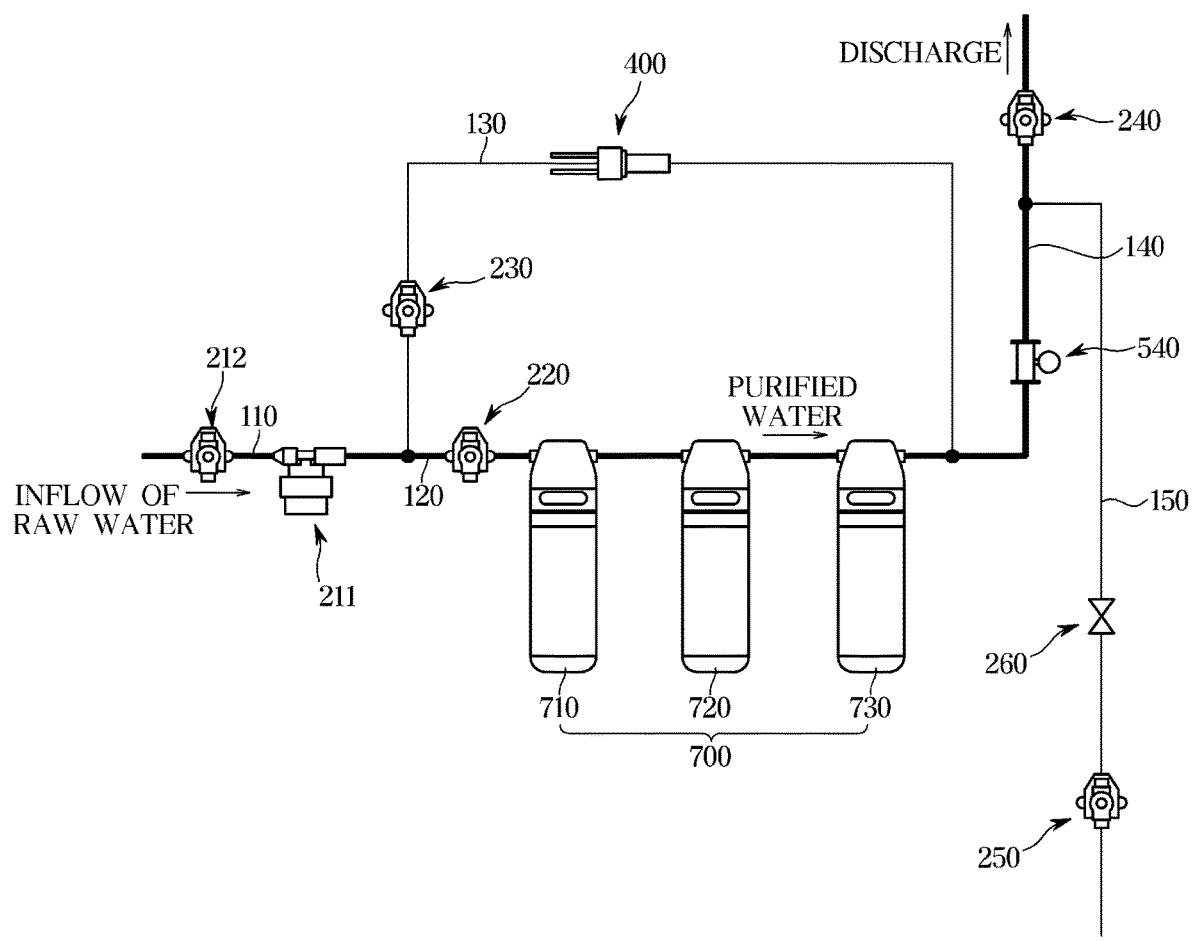
FIG. 2 is a water supply diagram showing a flow of water in a water purifier according to an embodiment, when the water purifier operates in a purifying mode.
Figure 3:
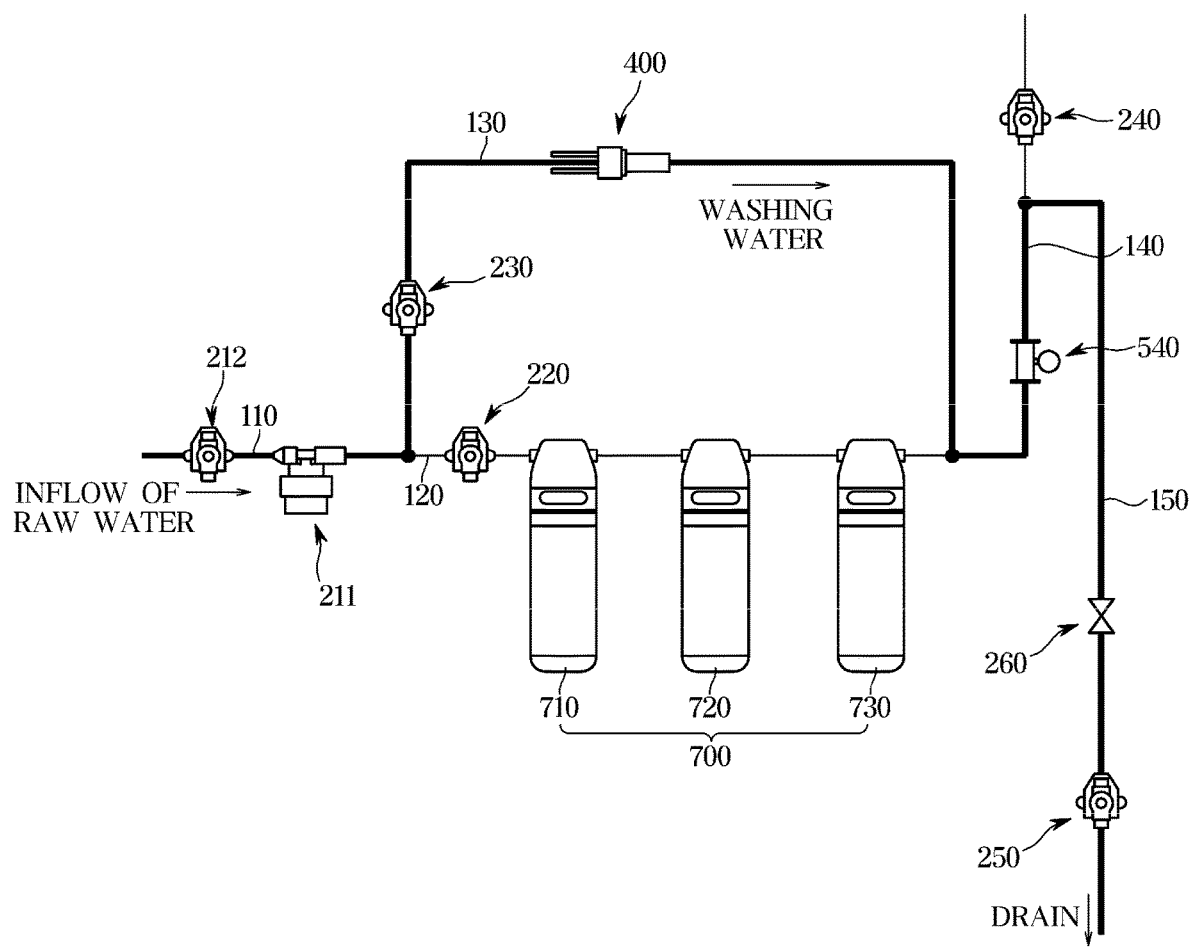
FIGS. 3 and 4 are water supply diagrams showing flows of water in a water purifier according to an embodiment, when the water purifier operates in a cleaning mode.
Figure 4:
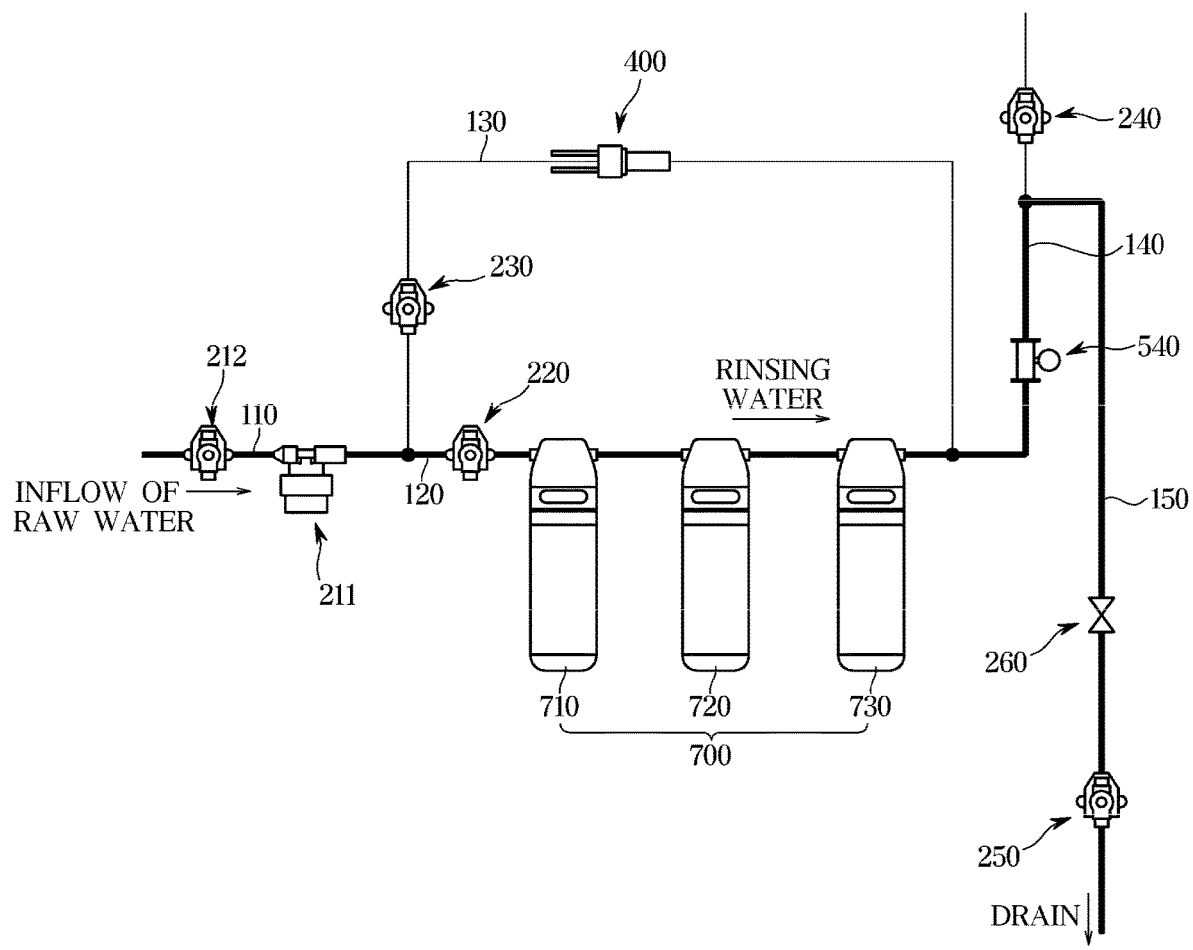

FIG. 2 is a water supply diagram showing a flow of water in a water purifier according to an embodiment, when the water purifier operates in a purifying mode, and FIGS. 3 and 4 are water supply diagrams showing a flow of water in a water purifier according to an embodiment, when the water purifier operates in a cleaning mode.

Referring to FIG. 2, in a case in which the water purifier 1 operates in the purifying mode, raw water may enter the water purifier 1 from the outside through the raw water flow path 110, and the pressure reducing valve 211 may reduce pressure of the raw water. The washing water valve 230 installed in the washing water flow path 130 may be closed, and the purified water valve 220 installed in the purified water flow path 120 may be opened. Accordingly, the raw water entered the raw water flow path 110 may flow to the purified water flow path 120.

The raw water may pass through the at least one filter 700 by flowing along the purified water flow path 120, and various foreign materials included in the raw water may be filtered by the filter 700.

The discharge valve 240 may be opened, and the drain valve 250 may be closed. Accordingly, the raw water passed through the at least one filter 700, that is, purified water may be discharged to the outside through the discharge flow path 140 and provided as drinking water to a user.

Meanwhile, in a case which the water purifier 1 operates in the cleaning mode, a washing operation of generating washing water to wash internal flow paths and valves and a rinsing operation of rinsing washing water may be performed.

Referring to FIG. 3, in a case in which the water purifier 1 performs a washing operation, raw water may enter the water purifier 1 from the outside through the raw water flow path 110, and the pressure reducing valve 211 may reduce pressure of the raw water. The washing water valve 230 installed in the washing water flow path 130 may be opened, and the purified water valve 220 installed in the purified water flow path 120 may be closed. Accordingly, the raw water entered the raw water flow path 110 may flow to the washing water flow path 130.

The raw water may be electrolyzed by the washing water generator 400 by flowing along the washing water flow path 130, to become washing water including a sterilizing material. That is, the washing water generator 400 may electrolyze raw water flowing along the washing water flow path 130 to generate washing water. The generated washing water may wash the flow paths and valves inside the water purifier 1.

Meanwhile, to discharge washing water to the outside, the discharge flow path 140 or the drain flow path 150 may be used. In the case in which the discharge flow path 140 is used, the discharge valve 140 may be opened and the drain valve 250 may be closed to discharge the washing water to the discharge nozzle through the discharge flow path 140. However, in this case, a user may need to put a container below the discharge nozzle to receive the washing water discharged from the discharge nozzle.

As shown in FIG. 3, in the case in which washing water is discharged through the drain flow path 150, the drain valve 250 may be opened to discharge the washing water to the drain through the drain flow path 150.

By keeping washing water in the flow paths and valves inside the water purifier 1 for a certain time, a washing effect may be improved. For this, when a preset time has elapsed after a washing operation is performed, the discharge valve 240 or the drain valve 250 may be opened to discharge washing water to the outside.

Referring to FIG. 4, in a case in which the water purifier 1 performs a rinsing operation, the washing water valve 230 may be closed and the purified water valve 220 may be opened. Raw water entered the raw water flow path 110 may be reduced in pressure by the pressure reducing valve 211 and then flow to the purified water flow path 120. Raw water flowing along the flow paths inside the water purifier 1 during the rinsing operation is referred to as rinsing water.

The rinsing water may rinse remaining washing water and foreign materials by flowing along the flow paths inside the water purifier 1.

By fully opening the drain valve 250, the rinsing water may be discharged to the outside through the discharge flow path 140 and the drain flow path 150.

Meanwhile, for the water purifier 1 to obtain a certain level of washing effect by performing the above-described washing operation, it may be needed to monitor whether the washing water generator 400 generates washing water normally.

Also, to minimize a risk that a user will drink washing water by performing the above-described rinsing operation in the water purifier 1, it may be also needed to monitor whether washing water has been properly rinsed.

For this, the water purifier 1 according to an embodiment may include an optical sensor for sensing light to identify whether washing water has been normally generated. Hereinafter, a configuration and operation of a water purifier including an optical sensor will be described in detail.

Figure 5:
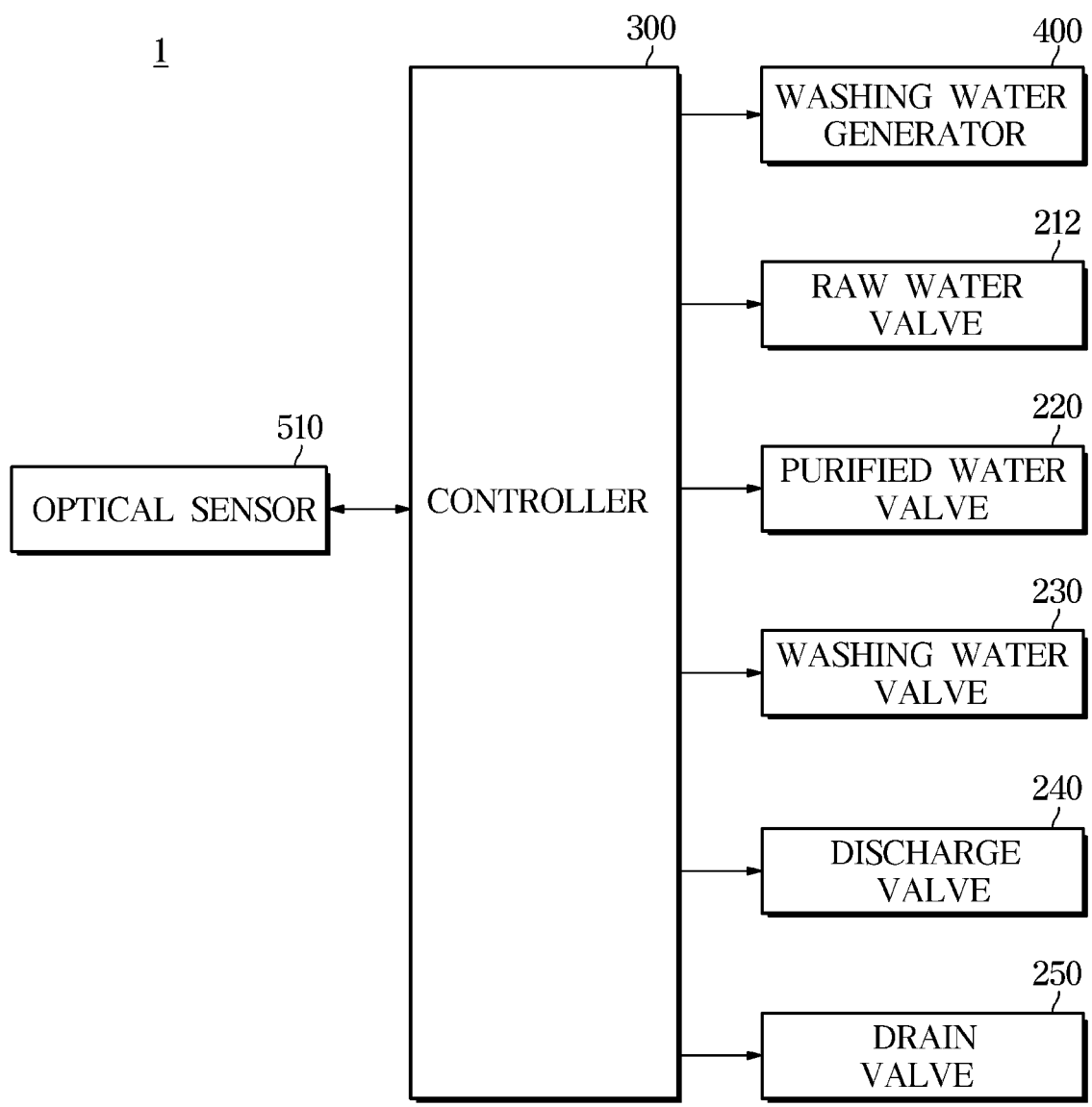
FIG. 5 is a control block diagram of a water purifier according to an embodiment.

FIG. 5 is a control block diagram of a water purifier according to an embodiment.

Referring to FIG. 5, the water purifier 1 according to an embodiment may include the washing water generator 400 for generating washing water including a sterilizing material by electrolyzing raw water flowing along the washing water flow path 130, an optical sensor 510 positioned at a rear end of the washing water generator 400 to output a value changing according to a degree of generation of bubbles included in washing water, and a controller 300 for performing a washing operation by controlling the washing water generator 400 and at least one valve provided in at least one of the raw water flow path, the purified water flow path, or the washing water flow path, and identifying whether an error has occurred in the washing operation based on an output from the optical sensor 510.

The at least one valve may include the raw water valve 212, the purified water valve 220, the washing water valve 230, the discharge valve 240, and the drain valve 250, as described above. However, an embodiment of the water purifier is not limited to these, and kinds, locations, and numbers of the valves may change according to a design change of the water purifier 1. Any valve that receives raw water from the outside and passes the received raw water to another flow path and valve inside the water purifier 1 via the washing water flow path 130 in which the washing water generator 400 is positioned may be used as a valve for performing a washing operation.

The controller 300 may include at least one memory storing a program for performing operations which will be described below, and various data required for executing the program, and at least one processor for executing the stored program.

A plurality of memories and a plurality of processors may be included in the controller 300. In this case, the plurality of memories and the plurality of processors may be integrated into one chip, or physically separated.

The controller 300 may control overall operations of the water purifier 1. For example, the controller 300 may control opening and closing of various valves including the raw water valve 212, the purified water valve 220, the washing water valve 230, the discharge valve 240, and the drain valve 250, to adjust a flow of a liquid, such as raw water, purified water, or washing water, on a flow path on which the corresponding valve is positioned, thereby operating the water purifier 1 in the purifying mode or the cleaning mode.

As a detailed example, in a case in which the water purifier 1 operates in the purifying mode, the controller 300 may open the raw water valve 212, the purified water valve 220, and the discharge valve 240, and close the washing water valve 230 and the drain valve 250.

As described above, by opening the raw water valve 212, raw water may enter the raw water flow path 110, and by opening the purified water valve 220 and closing the washing water valve 230, the raw water reduced in pressure by the pressure reducing valve 211 may flow to the purified water flow path 120. The raw water flowing along the purified water flow path 120 may be filtered by the filter 700 and purified, and then discharged to the outside through the discharge nozzle via the discharge flow path 140.

In response to an input of selecting the purifying mode from a user, the controller 300 may operate the water purifier 1 in the purifying mode. The input of selecting the purifying mode may be received through an inputter provided on an outer side of the water purifier 1, and the inputter may be implemented as a button, a touch pad, a lever, etc.

According to arrival of a cleaning time of the water purifier 1 or in response to an input of selecting the cleaning mode from a user, the controller 300 may operate the water purifier 1 in the cleaning mode. The input of selecting the cleaning mode may also be received through the inputter provided on the outer side of the water purifier 1.

The water purifier 1 may be cleaned periodically or according to usage of the water purifier 1. In a case in which the water purifier 1 is cleaned periodically, the controller 300 may clean the water purifier 1 automatically when a preset time has elapsed after the water purifier 1 is purchased or after the water purifier 1 is last cleaned. To measure the elapse of time, the water purifier 1 may include a timer.

In a case in which the water purifier 1 is cleaned according to usage, the controller 300 may clean the water purifier 1 automatically when a rate of flow measured by the flow meter 540 reaches a preset reference value.

Also, the flow meter 540 may be used to identify a replacement cycle of the filter 700.

Also, when the water purifier 1 operates in the cleaning mode, the controller 300 may open the raw water valve 212 and the washing water valve 230 and close the purified water valve 220 to perform a cleaning operation.

As described above, by opening the raw water valve 212, raw water may enter the raw water flow path 110, and by closing the purified water valve 220 and opening the washing water valve 230, the raw water reduced in pressure by the pressure reducing valve 211 may flow to the washing water flow path 130. The raw water flowing along the washing water flow path 130 may be electrolyzed by the washing water generator 400 to become washing water including a sterilizing material, and wash the flow paths and valves by flowing along the washing water flow path 130 and the discharge flow path 140.

When a preset time has elapsed after the cleaning operation is performed, the controller 300 may open the drain valve 250. Before the drain valve 250 opens, the washing water may be kept inside the water purifier 1 to improve a cleaning effect. By opening the drain valve 250, the washing water may be discharged to the outside through the drain flow path 150.

As another example, by closing the drain valve 250 and opening the discharge valve 240, the washing water may be discharged through the discharge nozzle.

To perform a rinsing operation, the controller 300 may open the raw water valve 212, the purified water valve 220, and the drain valve 250, and close the washing water valve 230 and the discharge valve 240.

As described above, by opening the raw water valve 212, raw water may enter the raw water flow path 110, and by opening the purified water valve 220 and closing the washing water valve 230, the raw water reduced in pressure by the pressure reducing valve 211 may flow to the purified water flow path 120. The raw water may rinse remaining washing water by flowing along the purified water flow path 120 and the discharge flow path 140. Accordingly, raw water or purified water flowing along the flow paths during a rinsing mode is referred to as rinsing water.

Because the drain valve 250 opens, rinsing water flowing through the discharge flow path 140 may enter the drain flow path 150 and then be discharged to the outside through the drain.

By rinsing washing water remaining inside the water purifier 1 with rinsing water through the rinsing operation, a risk that a user will drink washing water including a sterilizing material may be minimized.

Meanwhile, the water purifier 1 according to an embodiment may use an output from the optical sensor 510 to identify whether the flow paths and valves inside the water purifier 1 have been properly washed through the above-described washing operation or whether washing water remaining inside the water purifier 1 has been properly rinsed through the above-described rinsing operation.

By electrolyzing raw water in the washing water generator 400, a large amount of bubbles may be generated. The water purifier 1 according to an embodiment may identify a degree of generation of bubbles by using the optical sensor 510, and identify or estimate whether washing water including a sterilizing material has been properly generated, based on the degree of generation of bubbles.

At least one optical sensor 510 may be installed inside a flow path along which washing water flows, and an output from the optical sensor 510 may depend on a degree of generation of bubbles, that is, a number of bubbles included in washing water. Accordingly, whether an error has occurred in a washing operation, that is, whether washing water has been properly generated may be identified based on an output from the optical sensor 510.

The optical sensor 510 may be implemented as a light receiving element that receives light from the outside, or a light emitting device that itself emits light to be received.

For example, the optical sensor 510 may be implemented as a turbidity sensor. Turbidity is a measure of transparency of water, and represents resistance against transmission of light. The turbidity sensor may be a meter for quantitatively measuring a degree of turbidity of water, and may be used to check a concentration of a suspended material including pollutant in water.

The turbidity sensor may emit light and measure a degree of interference with transmission of the light according to a suspended material. Turbidity may increase by a large amount of bubbles included in water, as well as by a suspended material. Accordingly, an output from the turbidity sensor may depend on a number of bubbles included in washing water, and based on the principle, the controller 300 may identify whether washing water has been properly generated, based on an output from the turbidity sensor.

More specifically, the controller 300 may identify whether an error has occurred in a washing operation, based on whether an output from the optical sensor 510 satisfies a preset condition. That an error has occurred in a washing operation may mean that washing water has been not properly generated, and that washing water has been properly generated may mean that raw water is electrolyzed to generate a greater amount of sterilizing material than a reference value.

That washing water has been not properly generated may mean that the washing water generator 400 does not operate normally, and that the washing water generator 400 does not operate normally may mean that the washing water generator 400 has broken down, that the washing water generator 400 is at the end of the life, or that a foreign material is caught in the washing water generator 400, although there may be other causes. The controller 300 may identify a cause by which washing water has been not properly generated, based on an output from the optical sensor 510, which will be described below.

The preset condition used to identify whether an error has occurred in a washing operation is referred to as a first condition. The first condition may depend on a kind of the optical sensor 510 and a value output from the optical sensor 510. For example, in a case in which the optical sensor 510 is a turbidity sensor using Nephelometry, a turbidity value output from the optical sensor 510 may be in unit of a Nephelometric Turbidity unit (NTU).

In this case, the first condition may be set to a condition that an output of the optical sensor 510, having a unit of a NTU, is greater than or equal to a first reference value.

Also, for more accurate measurement, an amount of change of outputs from the optical sensor 510 may be used. In this case, a case in which an amount of change between an initial output of the optical sensor 510, obtained before the washing water generator 400 is turned on, and an output of the optical sensor 510, obtained after the washing water generator 400 is turned on is greater than or equal to the first reference value may be identified to be a case in which the first condition is satisfied. The first reference value may depend on whether a target based on which the first condition is identified is an output from the optical sensor 510 or an amount of change between outputs from the optical sensor 510.

The turbidity sensor described above may be an example that is applicable to an embodiment of the water purifier 1, and an embodiment of the water purifier 1 is not limited to this. Instead of the turbidity sensor, another sensor such as an image sensor may be adopted as the optical sensor 510 as long as the sensor can output a value changing according to a degree of generations of bubbles.

Meanwhile, the controller 300 may identify whether a rinsing operation has been normally performed, based on an output from the optical sensor 510. As described above, because washing water generated by electrolyzing raw water includes bubbles, an amount of bubbles remaining in rinsing water, that is, a degree of rinsing may be identified based on an output from the optical sensor 510, obtained after a rising operation.

The controller 300 may identify whether an output from the optical sensor 510 satisfies a preset condition, after performing a rinsing operation, and identify that the rinsing operation has been normally performed, according to an identification that the output from the optical sensor 510 satisfies the preset condition, thereby finishing the rising operation. Herein, the preset condition is referred to as a second condition that is distinguished from the first condition used to identify whether a washing operation has been normally performed.

The controller 300 may close the raw water valve 212 to finish the rinsing operation.

The second condition may be set to a condition that an output from the optical sensor 510 is smaller than or equal to a second reference value, or a condition that an amount of change between outputs from the optical sensor 510 is greater than or equal to the second reference value. In a case in which an amount of change between outputs from the optical sensor 510 is used, an initial value as a standard for calculating an amount of change may be an output from the optical sensor 510, obtained after a washing operation is performed and before a rinsing operation is performed. Likewise, the second reference value that is applied to a case in which an output from the optical sensor 510 is used to identify whether the second condition is satisfied and the second reference value that is applied to a case in which an amount of change between outputs from the optical sensor 510 is used to identify whether the second condition is satisfied may be different values.

According to an identification that the output from the optical sensor 510 does not satisfy the second condition, the controller 300 may identify that the rinsing operation has been not normally performed, and continue to perform the rinsing operation until the second condition is satisfied.

Figure 6:
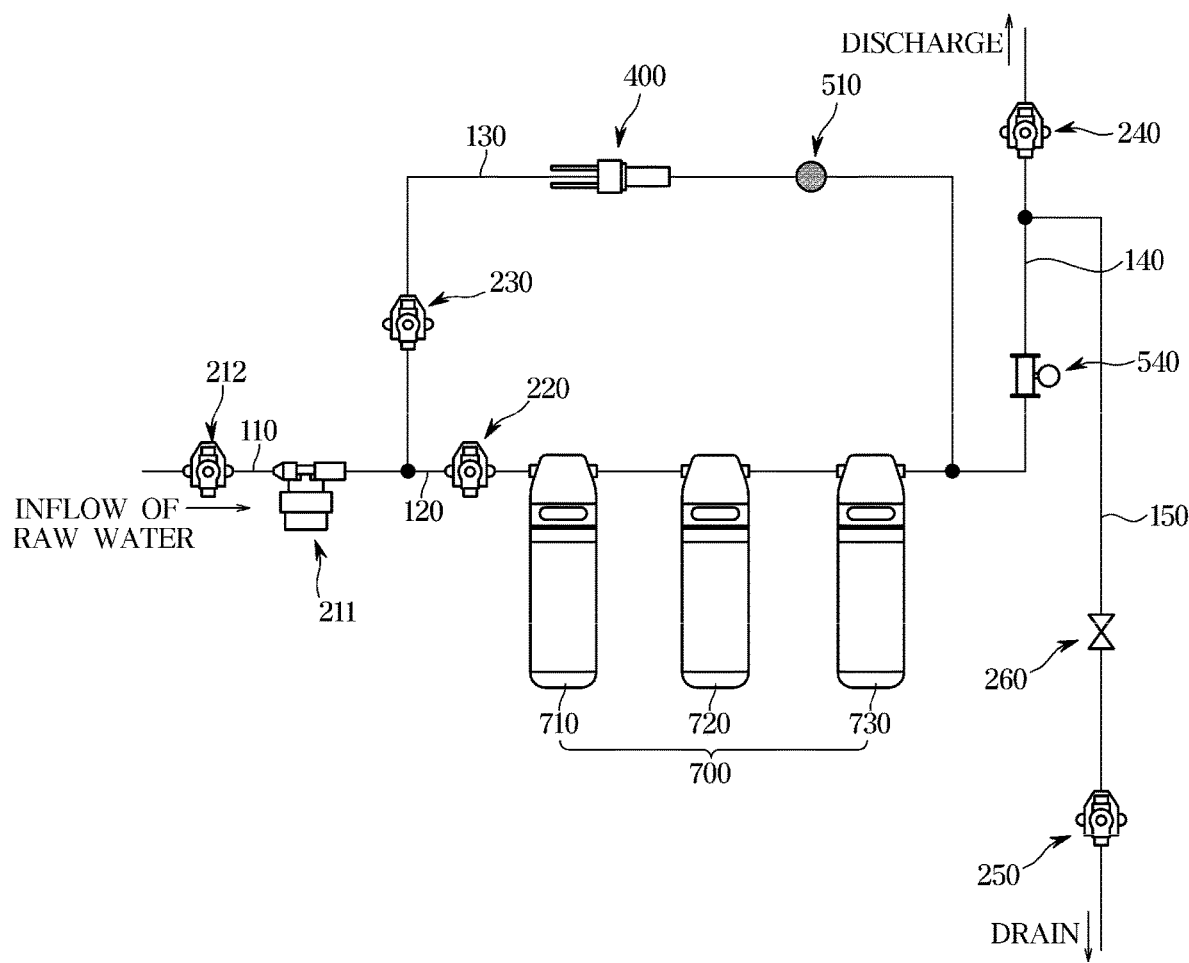
FIGS. 6 to 8 are water supply diagrams showing locations of an optical sensor positioned in a water purifier according to an embodiment.
Figure 7:
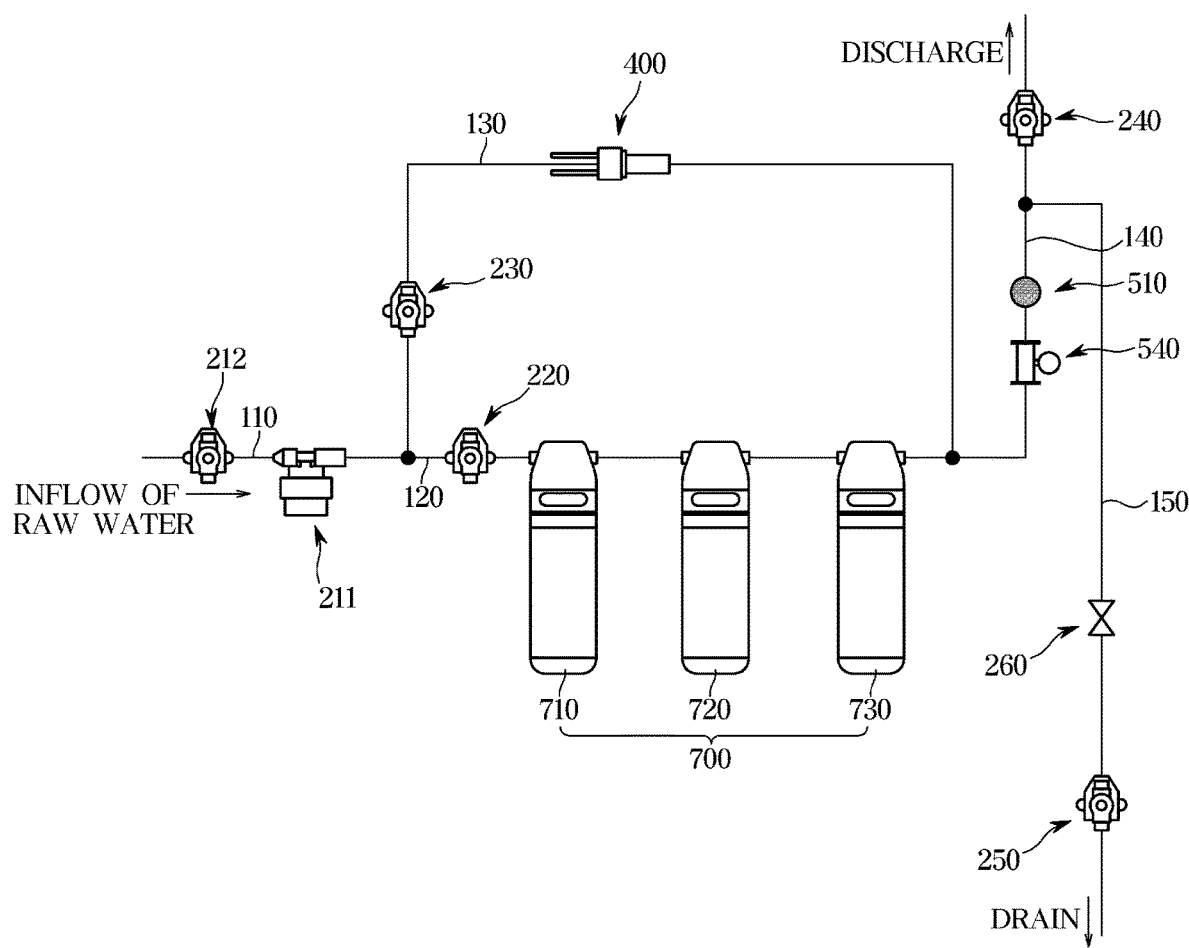
Figure 8:
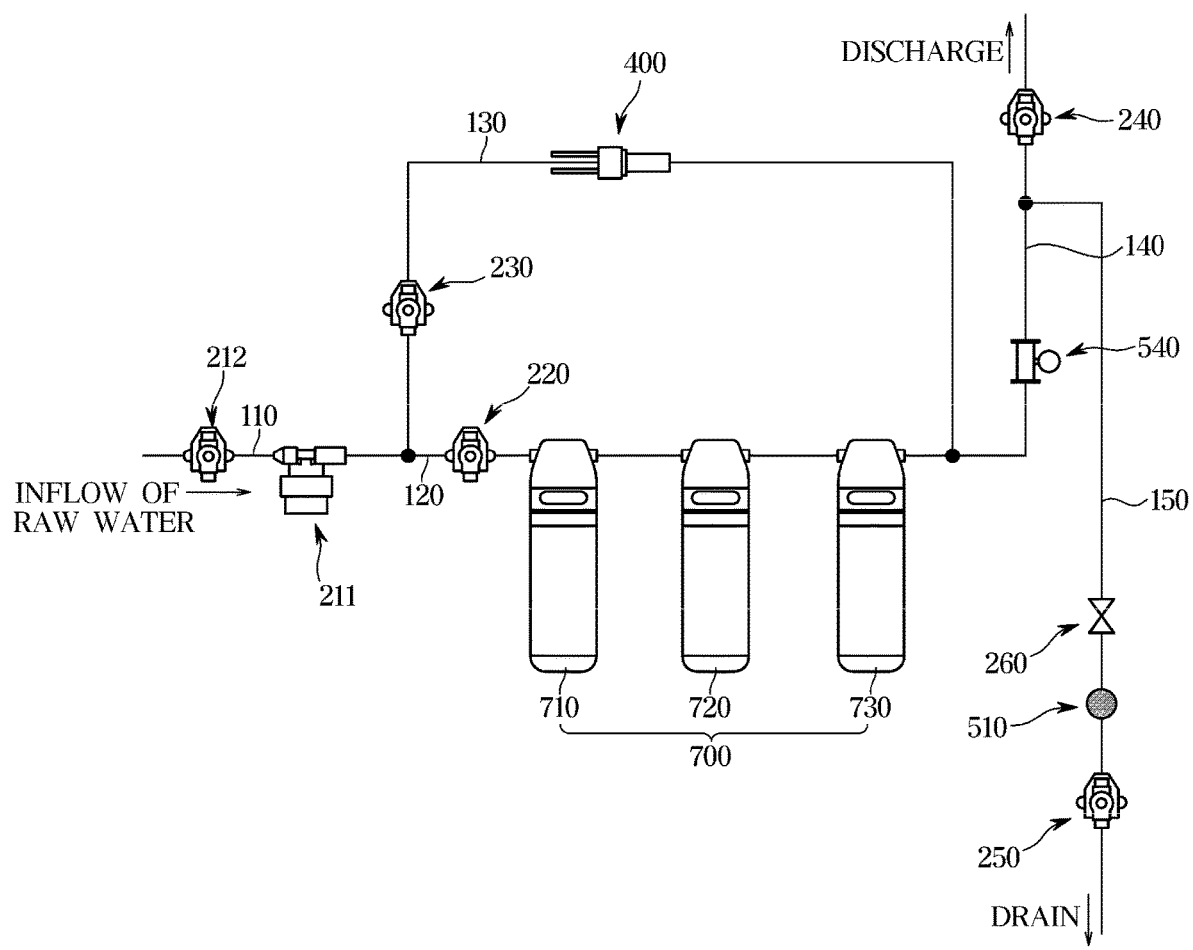

FIGS. 6 to 8 are water supply diagrams showing locations of an optical sensor positioned in a water purifier according to an embodiment.

Because the optical sensor 510 is used to identify a degree of generation of bubbles included in washing water, the optical sensor 510 may be provided at the rear end of the washing water generator 400. The rear end of the washing water generator 400 may represent a direction toward which washing water generated by the washing water generator 400 flows, or downstream of internal flow paths of the water purifier 1 with respect to the washing water generator 400.

For example, the optical sensor 510 may be, as shown in FIG. 6, positioned downstream of the washing water flow path 130 with respect to the washing water generator 400.

Also, the optical sensor 510 may be, as in an example of FIG. 7, positioned in the discharge flow path 140, or the optical sensor 510 may be, as in an example of FIG. 8, positioned in the drain flow path 150.

In any case, the optical sensor 510 may be positioned inside the washing water flow path 130, the discharge flow path 140, or the drain flow path 150 to output a value changing according to a number of bubbles included in water flowing along the corresponding flow path.

Meanwhile, in a case in which whether a rinsing operation has been normally performed is identified by using an output from the optical sensor 510, the optical sensor 510 may be provided in the discharge flow path 140 or the drain flow path 150. Alternatively, a plurality of optical sensors 510 may be provided such that one of the optical sensors 510 is positioned downstream of the washing water flow path 130 and another one of the optical sensors 510 is positioned in the discharge flow path 140 or the drain flow path 150 to be respectively used for an identification with respect to a washing operation and an identification with respect to a rinsing operation.

Figure 9:
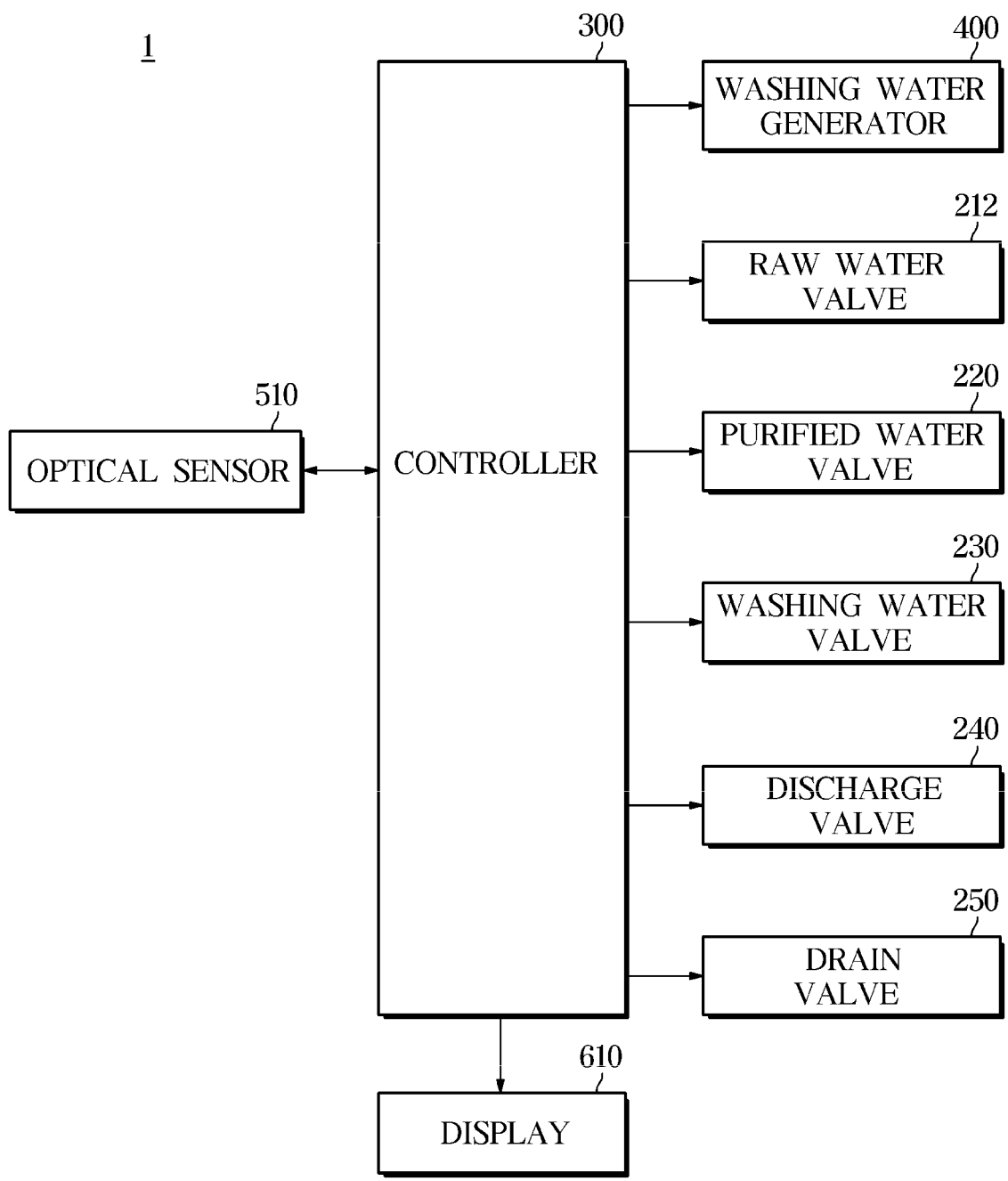
FIG. 9 is a control block diagram of a water purifier further including a display.
Figure 10:
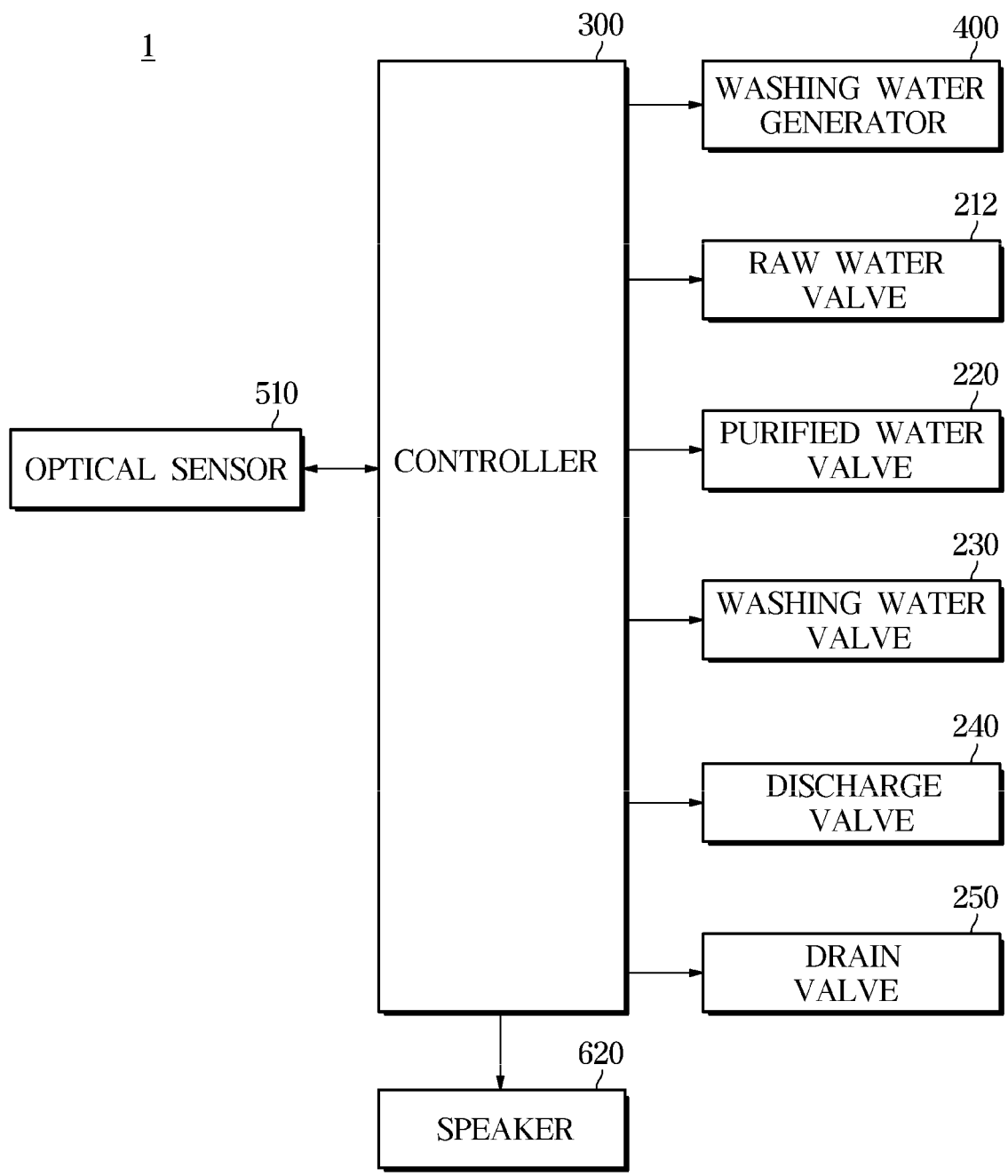
FIG. 10 is a control block diagram of a water purifier further including a speaker.
Figure 11:
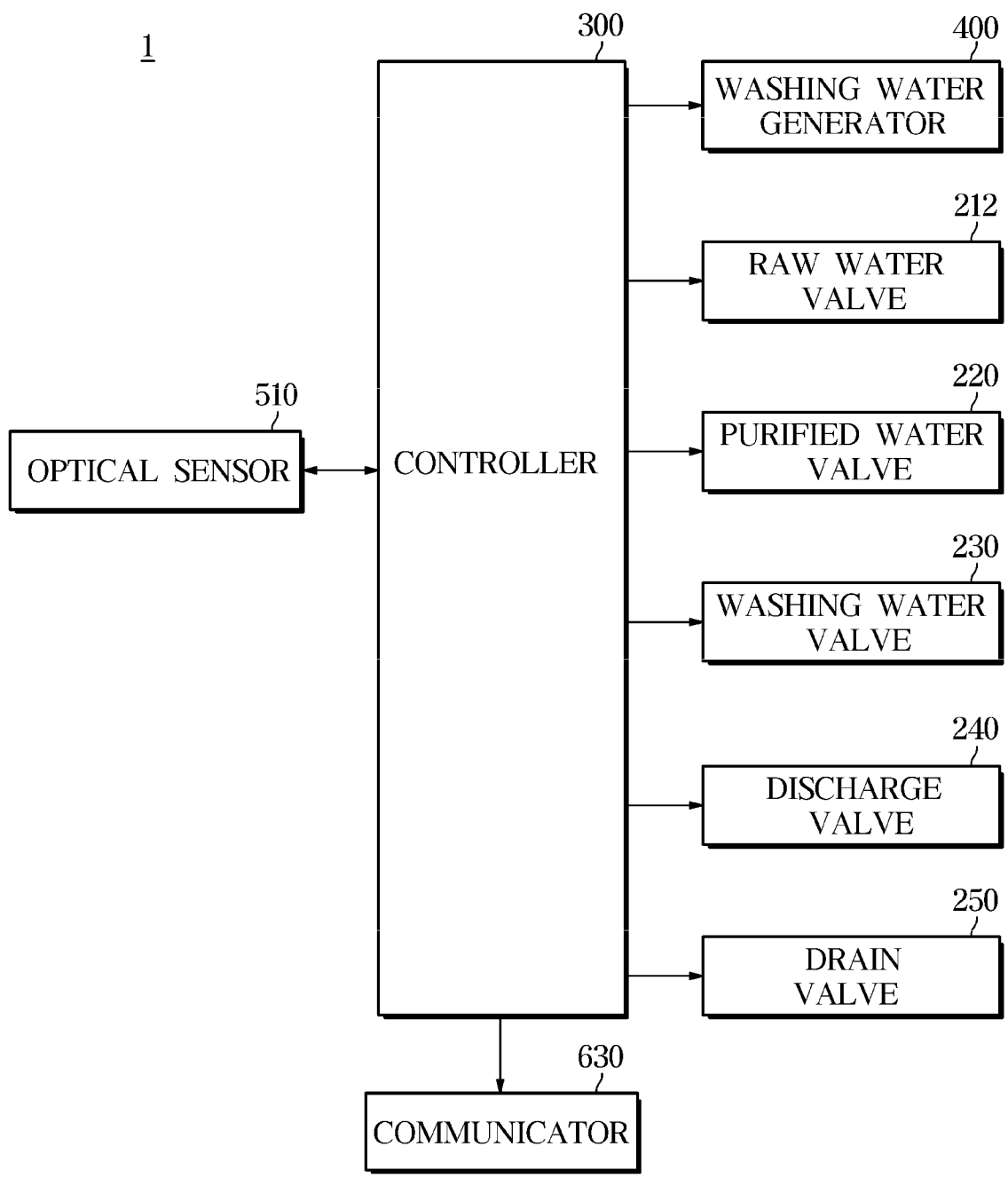
FIG. 11 is a control block diagram of a water purifier further including a communicator.

FIG. 9 is a control block diagram of a water purifier further including a display, FIG. 10 is a control block diagram of a water purifier further including a speaker, and FIG. 11 is a control block diagram of a water purifier further including a communicator.

As shown in FIG. 9, the water purifier 1 according to an embodiment may further include a display 610. The display 610 may be provided on the outer side of the water purifier 1 to provide visual information to a user.

The display 610 may be implemented in a form of a lamp for displaying a specific color, or may be implemented as a LCD, a LED display, an OLED display, etc. to display text or images.

Also, in a case in which the display 610 is implemented as a touch screen, the display 610 may function as an inputter for receiving a control command from a user.

The controller 300 may visually provide information related to a washing operation or a rinsing operation to a user through the display 610. For example, the controller 300 may identify that an error has occurred in a washing operation, according to an identification based on an output from the optical sensor 510. In this case, the controller 300 may control the display 610 to display a warning related to the error. The warning related to the error may include content notifying that a washing operation has been not normally performed, content notifying that the washing water generator 400 has broken down, or content notifying that the water purifier 1 needs to be repaired. The warning may be displayed as text or an image.

Also, according to an identification that a washing operation has been normally performed, the controller 300 may display information notifying that a washing operation has been normally performed through the display 610.

According to an identification that a rinsing operation has been normally performed based on an output from the optical sensor 510, the controller 300 may control the display 610 to display information notifying that a rinsing operation has been completed. Meanwhile, according to an identification that a rinsing operation has been not normally performed, the controller 300 may control the display 610 to display information notifying that a rinsing operation will continue to be performed.

As shown in FIG. 10, the water purifier 1 according to an embodiment may further include a speaker 620. The speaker 620 may be provided on the outer side of the water purifier 1 to provide aural information to a user.

The above-described information displayed on the display 610 may be output through the speaker 620, and, in a case in which the water purifier 1 includes both the display 610 and the speaker 620, the water purifier 1 may output the above-described information through at least one of the display 610 or the speaker 620.

By aurally or visually outputting information related to execution of a washing operation or a rinsing operation, as described above, information related to an operation of the water purifier 1 may be effectively transferred to a user, and enable the user to actively recognize a state of the water purifier 1 which he/she uses.

Also, the display 610 or the speaker 620 may provide information related to an output from the optical sensor 510. A service engineer of the water purifier 1 may identify breakdown or remaining service life of the washing water generator 400 based on the provided information, and use the breakdown or remaining service life as an indicator for repair or replacement of the washing water generator 400.

Alternatively, the controller 300 may itself identify breakdown or remaining service life of the washing water generator 400 based on an output from the optical sensor 510, and the display 610 may provide a result of the identification through the speaker 620.

As shown in FIG. 11, the water purifier 1 according to an embodiment may further include a communicator 630. The communicator 630 may include one or more communication modules that transmit and receive data according to a predefined communication protocol. For example, the communicator 630 may include a wireless communication module or a short-range communication module.

The wireless communication module may include at least one of various wireless communication modules that can be connected to an internet network by a wireless communication method, such as Wifi, Wireless broadband, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), fourth-Generation (4G) Mobile Communication, fifth-Generation (5G) Mobile Communication, etc.

The short-range communication module may include at least one of various short-range communication modules, such as a Bluetooth module, an Infrared communication module, a Radio Frequency Identification (RFID) communication module, a Wireless Local Access Network (WLAN) communication module, a NFC communication module, a Zigbee communication module, etc., which transmit and receive signals by using a wireless communication network at a short distance.

According to an identification that an error has occurred in the washing operation based on an output from the optical sensor 510, the controller 300 may control the communicator 630 to transmit information related to the error to an external server or an external device that manages the water purifier 1.

The water purifier 1 may have been registered in advance in the external server or the external device that manages the water purifier 1, and the external server or the external device may receive the information related to the error and analyze the received information to perform a required follow-up operation.

For example, the controller 300 may transmit information about an output from the optical sensor 510, or the controller 300 may transmit a result of an identification on breakdown or remaining service life of the washing water generator 400 based on an output from the optical sensor 510.

Figure 12:
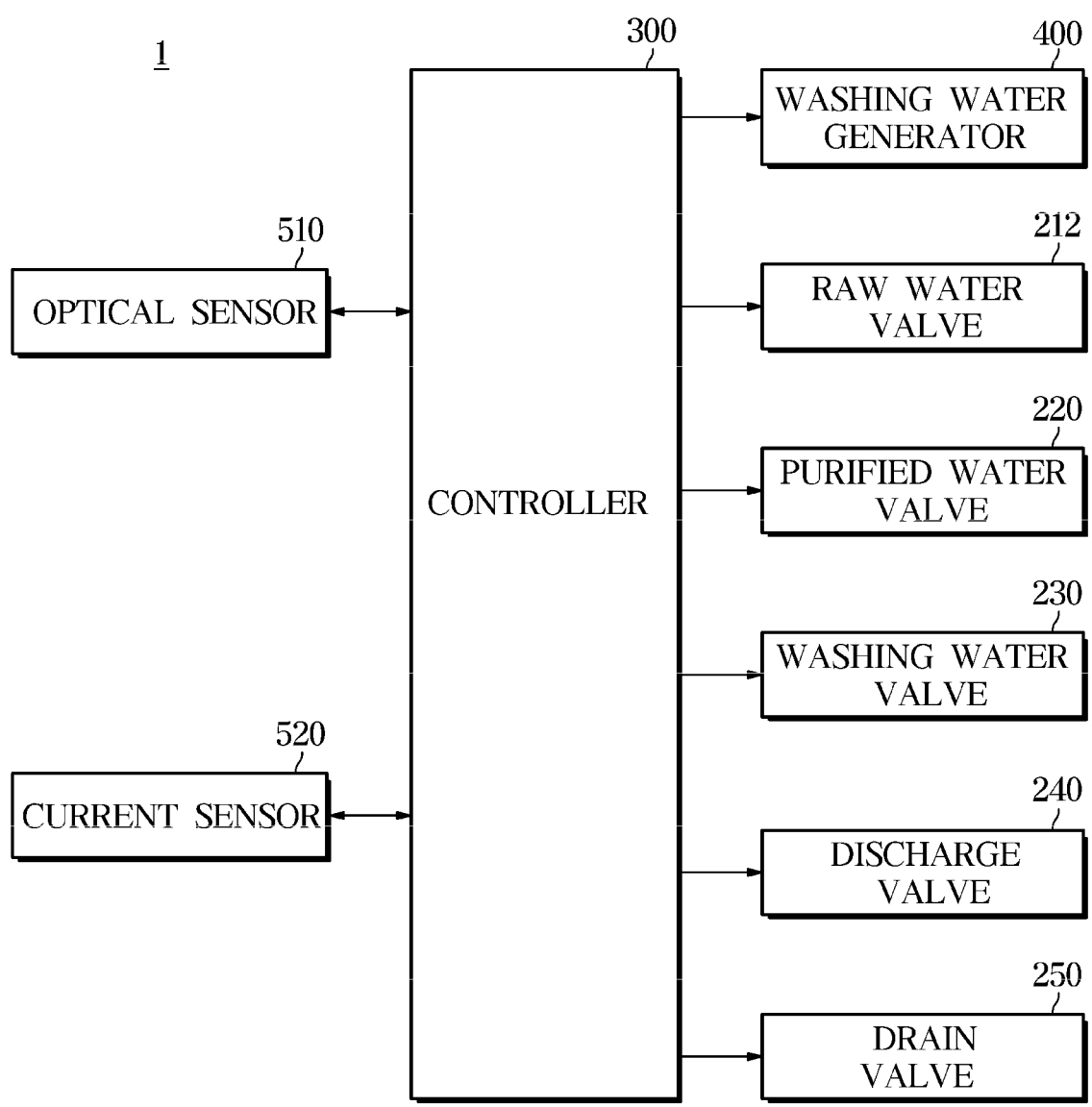
FIG. 12 is a control block diagram of a water purifier further including a current sensor.
Figure 13:
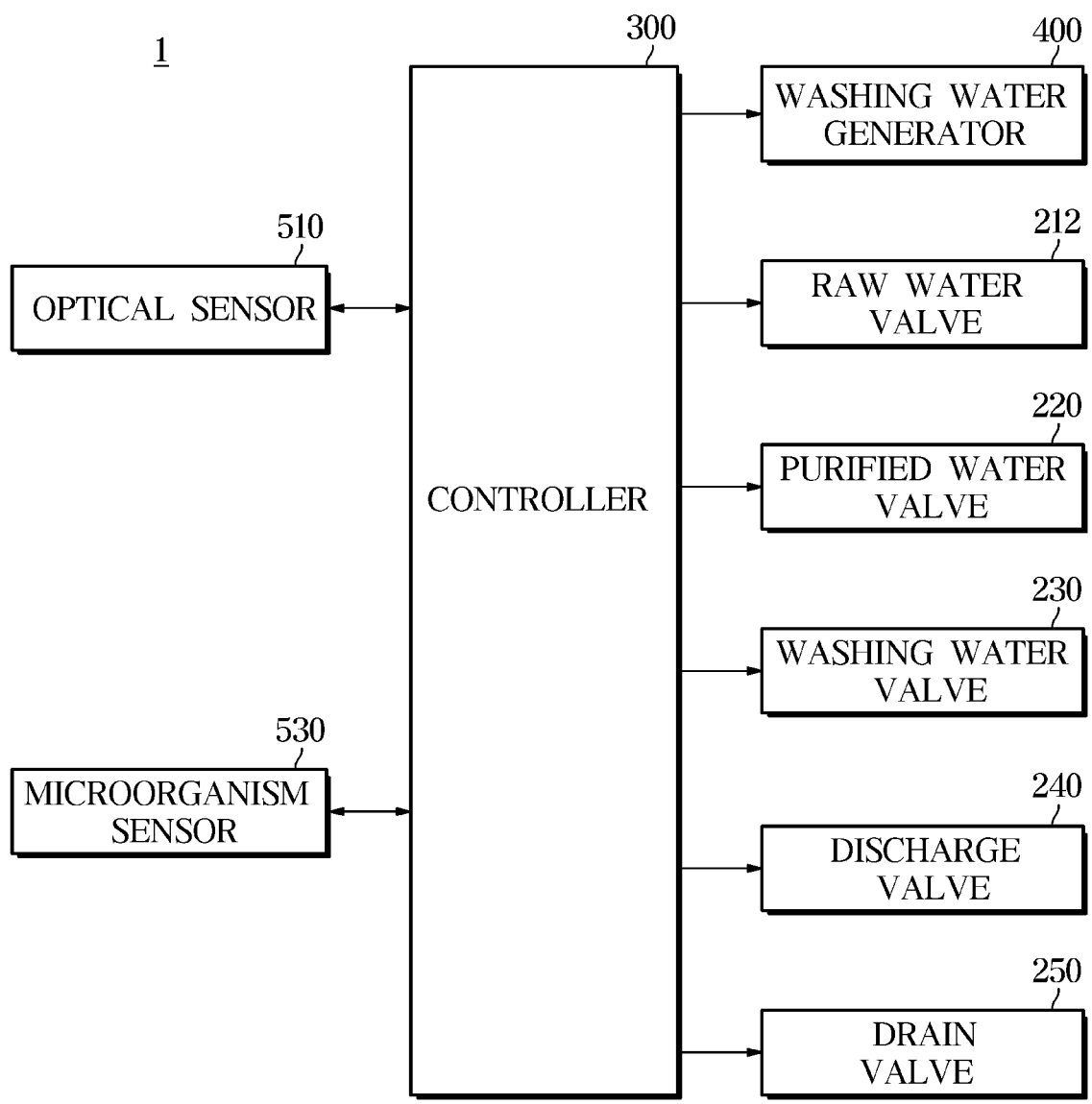
FIG. 13 is a control block diagram of a water purifier further including a microorganism sensor.

FIG. 12 is a control block diagram of a water purifier further including a current sensor, and FIG. 13 is a control block diagram of a water purifier further including a microorganism sensor.

Referring to FIG. 12, the water purifier 1 according to an embodiment may further include a current sensor 520 for measuring current that is supplied to the washing water generator 400.

The controller 300 may identify whether the washing water generator 400 operates normally, based on an output from the optical sensor 510 and an output from the current sensor 520.

As described above, according to application of a voltage to the plurality of plate electrodes included in the washing water generator 400, current may flow between the plurality of plate electrodes. It may be estimated that a number of bubbles included in electrolyzed water will increase as current supplied to the washing water generator 400 increases. Accordingly, the controller 300 may have stored a relationship between outputs from the current sensor 520 and outputs from the optical sensor 510 in advance, and identify an output of the optical sensor 510 corresponding to an output of the current sensor 520 based on the stored relationship.

According to an identification that an output from the optical sensor 510, obtained after the washing water generator 400 is turned on, does not correspond to an output from the current sensor 520, the controller 300 may identify that the washing water generator 400 does not normally operate. That the washing water generator 400 does not normally operate may mean that the washing water generator 400 has broken down, that the washing water generator 400 is at the end of the life, or that a foreign material is caught in the washing water generator 400.

Also, according to an identification that an output from the current sensor 520 is smaller than a reference value, the controller 300 may identify that the washing water generator 400 does not normally operate. For example, in a case in which a value of current flowing through the washing water generator 400, that is, an output from the current sensor 520 is smaller than the reference value, the controller 300 may identify that the washing water generator 400 is at the end of the life.

In a case in which the water purifier 1 includes the display 610 or the speaker 620, the controller 300 may also output a result of an identification based on an output from the current sensor 520 or information related to an output from the current sensor 520 through the display 610 or the speaker 620.

Also, in a case in which the water purifier 1 includes the communicator 630, the controller 300 may transmit a result of an identification based on an output from the current sensor 520 or information related to an output from the current sensor 520 to an external server or an external device through the communicator 630.

As described above, according to an identification that an error has occurred in a washing operation, the controller 300 may perform an operation for responding to the error, that is, an error response control, as well as outputting a warning related to the error.

For example, the controller 300 may gradually increase a voltage that is applied to the washing water generator 400 to adjust an output from the optical sensor 510 or an output from the current sensor 520 to reach a target value.

Alternatively, the controller 300 may secure sterilizing performance by increasing an execution time of a washing operation to a longer time than a basically set time. By increasing an execution time of a washing operation, an amount of washing water generated by the washing water generator 400 may increase and a reaction time for which foreign materials inside the flow paths and valves react with the washing water may increase, resulting in an improvement of sterilizing performance.

The error response control may be performed before or after a warning related to an error is output through the display 610 or the speaker 620.

Referring to FIG. 13, the water purifier 1 according to an embodiment may further include a microorganism sensor 530 for measuring microorganisms included in water flowing along the flow paths inside the water purifier 1.

The microorganism sensor 530 may be positioned in the discharge flow path 140 or the drain flow path 150 to measure microorganisms included in rinsing water while a rinsing operation is performed. The microorganism sensor 530 may adopt one of various methods for measuring microorganisms included in rinsing water. For example, the microorganism sensor 530 may measure an amount of microorganisms existing in rinsing water by using a biological luminescent reaction according to ATP content. The microorganism sensor 530 may use or not use a reagent to measure microorganisms.

The controller 300 may identify whether an additional washing operation needs to be performed on an output from the microorganism sensor 530. For example, the controller 300 may identify whether an output from the microorganism sensor 530 satisfies a preset condition (hereinafter, referred to a third condition), and according to an identification that an output from the microorganism sensor 530 is smaller than or equal to a preset reference value (hereinafter, referred to as a third reference value), the controller 300 may identify that the output from the microorganism sensor 530 satisfies the third condition.

In this case, the controller 300 may identify that a washing operation has been sufficiently performed, and may perform no additional washing operation. According to an identification that the output from the microorganism sensor 530 is greater than the third reference value, the controller 300 may perform an additional washing operation. The additional washing operation may be performed according to the same process as the above-described washing operation. The additional washing operation may also involve an additional rinsing operation.

As such, by measuring microorganisms included in water flowing along a flow path after a washing operation and a rinsing operation are performed, whether the flow paths and valves have been actually sufficiently washed may be identified regardless of whether washing water has been normally generated, and thereby, a washing effect of the water purifier 1 may be maximized.

Hereinafter, a method for controlling a water purifier, according to an embodiment, will be described. To perform the method for controlling the water purifier, according to an embodiment, the above-described water purifier 1 may be used. Accordingly, descriptions given above with reference to FIGS. 1 to 13 may also be applied in the same way to the method for controlling the water purifier, according to an embodiment, without otherwise noted.

Figure 14:
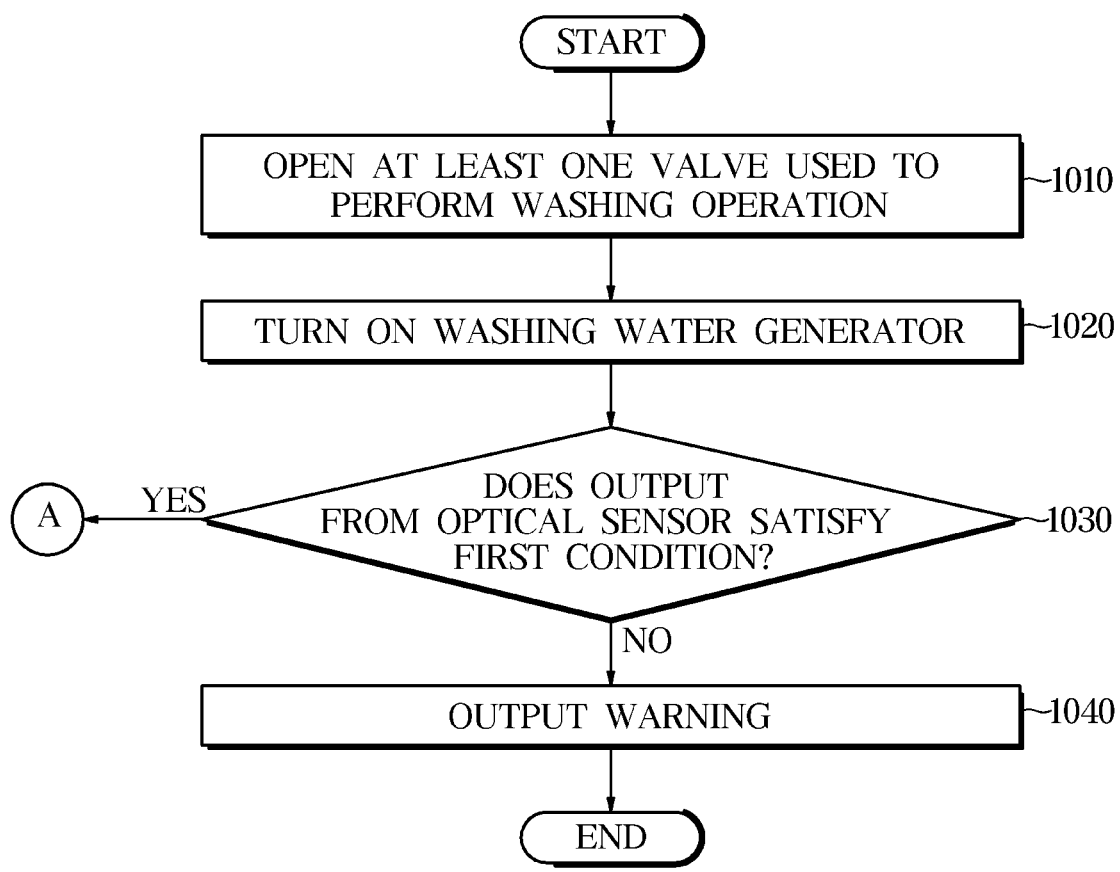
FIG. 14 is a flowchart illustrating a washing operation in a method for controlling a water purifier according to an embodiment.

FIG. 14 is a flowchart illustrating a washing operation in a method for controlling a water purifier according to an embodiment.

Referring to FIG. 14, the method for controlling the water purifier, according to an embodiment, may include opening at least one valve used to perform a washing operation (1010), and turning on the washing water generator 400 (1020). The valve used to perform the washing operation may depend on a design of the water purifier 1. In the water purifier 1 having a structure shown in FIG. 1, the controller 300 may open the raw water flow path 212 and the washing water flow path 230, and close the purified water valve 220 and the discharge valve 240. Although the controller 300 also opens the drain valve 150, the controller 300 may open the drain valve 150 after a preset time has elapsed to keep washing water inside the water purifier 1 for the preset time, thereby improving a washing effect.

Whether an error has occurred in a washing operation may be identified based on an output from the optical sensor 510. More specifically, whether an output from the optical sensor 510 satisfies the first condition may be identified (1030), and according to an identification that the output from the optical sensor 510 does not satisfy the first condition (NO in 1030), it may be identified that an error has occurred in the washing operation, and a warning may be output (1040).

As described above, a large amount of bubbles may be generated by electrolyzing raw water in the washing water generator 400, and the optical sensor 510 may be installed inside a flow path along which washing water flows to output a value changing according to a degree of generation of bubbles included in the washing water.

The first condition may depend on a kind of the optical sensor 510 and a value output from the optical sensor 510. For example, a case in which an amount of change between an output from the optical sensor 510, obtained before the washing water generator 400 is turned on, and an output from the optical sensor 510, obtained after the washing water generator 400 is turned on is greater than or equal to the first reference value may be identified to be a case in which the first condition is satisfied.

In a case in which the output from the optical sensor 510 does not satisfy the first condition, a warning may be output through the display 610 or the speaker 620, wherein the warning may include information related to an error. Also, the information related to the error may be transmitted to an external server or an external device that manages the water purifier 1, through the communicator 630.

Content related to outputting of information through the display 610 or the speaker 620 and transmission of information through the communicator 630 has been described above with reference to FIGS. 9 to 11, and therefore, detailed descriptions thereof will be omitted.

Meanwhile, to detect an error of a washing operation, both an output from the optical sensor 510 and an output from the current sensor 520 may be used. As described above with reference to FIG. 12, current applied to the washing water generator 400 may be detected by the current sensor 520, and an error of the washing operation may be detected based on an output from the optical sensor 510 and an output from the current sensor 520. The detected error of the washing operation may include information about whether the washing water generator 400 operates normally.

More specifically, in a case in which the output from the optical sensor 510 does not correspond to the output from the current sensor 520, it may be identified that the washing water generator 400 does not normally operate. That the washing water generator 400 does not normally operate may mean that the washing water generator 400 has broken down, that the washing water generator 400 is at the end of the life, or that a foreign material is caught in the washing water generator 400.

Also, according to an identification that an error has occurred in the washing operation, an operation for responding to the error, that is, an error response control, as well as outputting a warning related to the error, may be performed.

For example, the controller 300 may gradually increase a voltage that is applied to the washing water generator 400, and adjust an output from the optical sensor 510 or an output from the current sensor 520 to reach a target value, or the controller 300 may increase an execution time of the washing operation to a longer time than a basically set time to secure sterilizing performance.

The error response control may be performed before or after the warning related to the error is output through the display 610 or the speaker 620.

Figure 15:
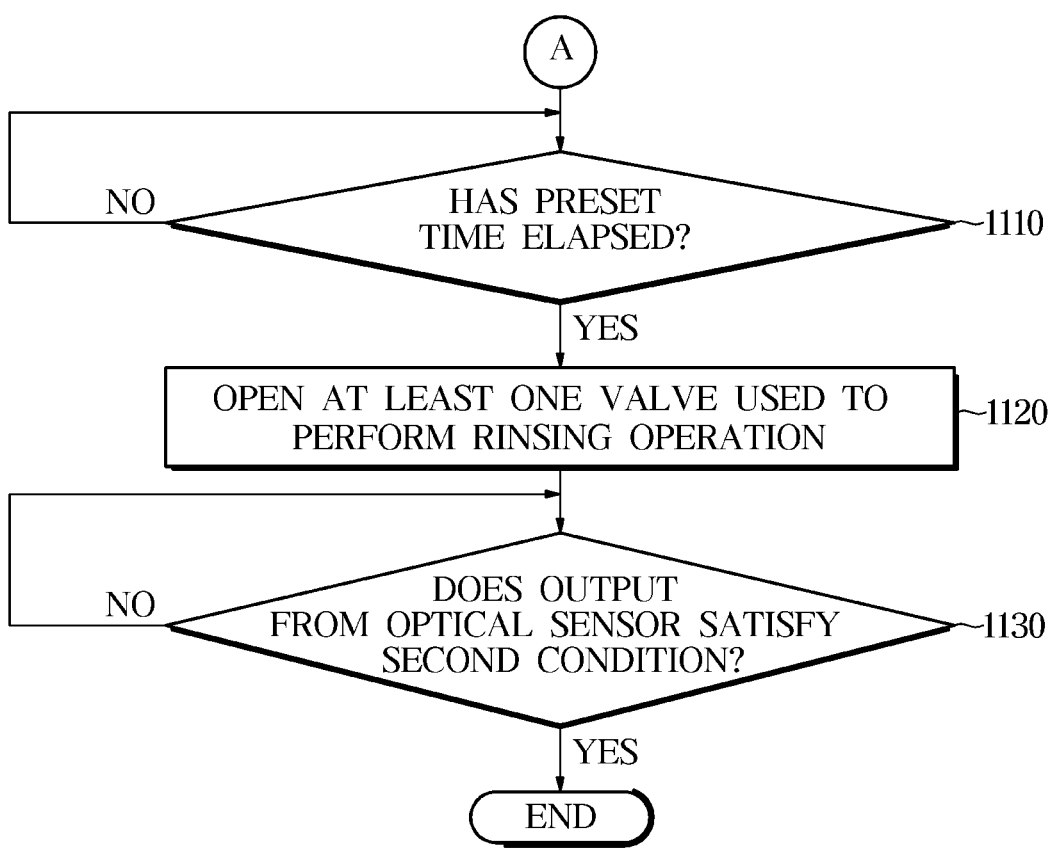
FIG. 15 is a flowchart illustrating a rinsing operation in a method for controlling a water purifier according to an embodiment.

FIG. 15 is a flowchart illustrating a rinsing operation in a method for controlling a water purifier according to an embodiment.

In the case in which the output from the optical sensor 510 satisfies the first condition in the flowchart of FIG. 14 (YES in 1030), at least one valve used to perform a rinsing operation may open (1120) when a preset time has elapsed (YES in 1110), as shown in FIG. 15. The valve used to perform the rinsing operation may also depend on a design of the water purifier 1. In the water purifier 1 having the above-described structure of FIG. 1, the controller 300 may open the raw water valve 212, the purified water valve 220, and the drain valve 250 and close the washing water valve 230 and the discharge valve 240.

Whether the output from the optical sensor 510 satisfies the second condition may be identified (1130). According to an identification that the output from the optical sensor 510 satisfies the second condition, it may be identified that a rinsing operation has been normally performed, and the rising operation may be finished. To finish the rinsing operation, the controller 300 may close the raw water valve 212.

Figure 16:
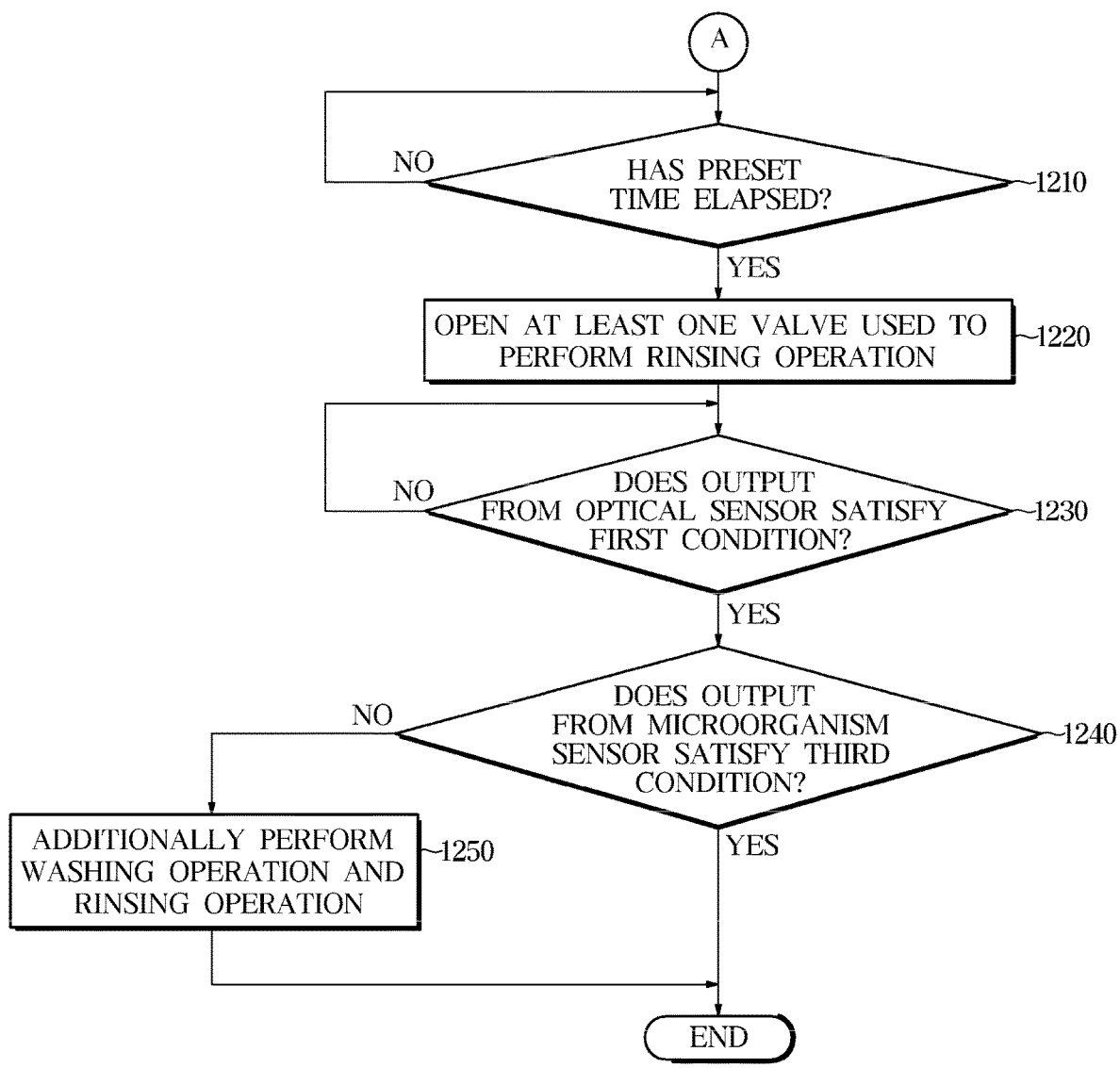
FIG. 16 is a flowchart illustrating an operation of identifying whether an additional washing operation needs to be performed by using a microorganism sensor in a method for controlling a water purifier according to an embodiment.

FIG. 16 is a flowchart illustrating an operation of identifying whether an additional washing operation needs to be performed by using a microorganism sensor in a method for controlling a water purifier according to an embodiment.

As described above, in the case in which the output from the optical sensor 510 satisfies the first condition (YES in 1030), at least one valve used to perform a rinsing operation may open (1220) when a preset time has elapsed (YES in 1210), as shown in FIG. 16.

It may be identified whether the output from the optical sensor 510 satisfies the second condition (1230), and, according to an identification that the output from the optical sensor 510 satisfies the second condition (YES in 1230), it may be identified whether an output from the microorganism sensor 530 satisfies the third condition (1240).

According to an identification that the output from the microorganism sensor 530 satisfies the third condition (YES in 1240), it may be identified that the washing operation has been sufficiently performed, and the rinsing operation may be finished.

According to an identification that the output from the microorganism sensor 530 does not satisfy the third condition (NO in 1240), a washing operation and a rinsing operation may be additionally performed (1250). The washing operation and rinsing operation that are additionally performed may be performed according to the same process as the above-described washing operation and rinsing operation.

The disclosure provides a water purifier capable of maintaining the inside clean to provide clean drinking water to users by identifying whether washing water has been normally generated, based on an output from an optical sensor positioned downstream of a washing water generator for generating washing water, and performing a proper control according to a result of the identification, and a method for controlling the water purifier.

In a water purifier and a control method thereof, according to an embodiment, it may be possible to maintain the inside clean to provide clean drinking water to users by identifying whether washing water has been normally generated, based on an output from an optical sensor positioned downstream of a washing water generator for generating washing water, and performing a proper control according to a result of the determination, and a method for controlling the water purifier.

The above detailed description provides examples of the present disclosure. In addition, the above description explains by showing preferred embodiments of the present disclosure, and the present disclosure may be used in various different combinations, changes and environments. That is, the present disclosure may be modified or changed within the scope of the spirit of the present disclosure disclosed in this specification, within a scope equivalent to the disclosed contents, and/or within the scope of the technique(s) or knowledge of the related art. The above embodiments describe the best conditions for implementing the technical spirit of the present disclosure, and various changes in the specific application fields and usages of the present disclosure also can be made. Accordingly, the detailed description of the present disclosure as described above shows disclosed embodiments and is not intended to limit the present disclosure. In addition, the appended claims should be interpreted as also including other embodiments.

What is claimed is:

1. A water purifier comprising:
   a raw water flow path along which raw is flowable;
   a purified water flow path connectable to the raw water flow path and, with the purified water flow path connected to the raw water flow path, along which the raw water from the raw water flow path is flowable;
   at least one filter provided in the purified water flow path and configured to filter the raw water that is flowable along the purified water flow path and to discharge purified water to the purified water flow path downstream of the at least one filter;
   a washing water flow path connectable to:
      the raw water flow path and, with the washing water flow path connected to the raw water flow path, along which the raw water from the raw water flow path is flowable, or
      the purified water flow path and,
         with the washing water flow path connected to the purified water flow path,
            along which the raw water from the purified water flow path is flowable, or
            along which the purified water from the purified water flow path is flowable;
   a washing water generator in the washing water flow path and configured to electrolyze the raw water or the purified water that is flowable along the washing water flow path to generate washing water including hypochlorous acid and to discharge the generated washing water to the washing water flow path;
   a valve in at least one of the raw water flow path, the purified water flow path, and the washing water flow path;
   an optical sensor at a discharging end of the washing water generator, the optical sensor configured to sense a degree of generation of bubbles included in the generated washing water and output a value corresponding to the sensed degree of generation of bubbles; and
   a controller configured to:
      selectively connect the raw water flow path to the washing water flow path or the purified water flow path based on a washing operation,
      control the washing water generator and the valve to perform the washing operation, and
      identify whether an error has occurred in the washing operation based on the value output from the optical sensor.

2. The water purifier of claim 1, further comprising:
   a display provided on an outer side of the water purifier,
   wherein the controller is further configured to:
      control, in response to identifying that the error has occurred in the washing operation, the display to display information related to the error.

3. The water purifier of claim 1, further comprising:
   a speaker,
   wherein the controller is further configured to:
      control, in response to identifying that the error has occurred in the washing operation, the speaker to output information related to the error.

4. The water purifier of claim 1, further comprising:
   a communicator,
   wherein the controller is further configured to:
      control, in response to identifying that the error has occurred in the washing operation, the communicator to transmit information related to the error to an external server or an external device that manages the water purifier.

5. The water purifier of claim 1, further comprising:
   a current sensor configured to detect current flowing through the washing water generator,
   wherein the controller is further configured to:
      identify whether the error has occurred in the washing operation based on the value output from the optical sensor and the current detected by the current sensor.

6. The water purifier of claim 5, wherein
   the controller is further configured to:
      identify that the washing water generator has not operated normally, in response to identifying that the value output from the optical sensor does not correspond to the current detected by the current sensor.

7. The water purifier of claim 1, wherein
   the controller is further configured to:
      perform a rinsing operation by controlling the valve in at least one of the raw water flow path, the purified water flow path, and the washing water flow path, when a preset time has elapsed after the washing operation is performed.

8. The water purifier of claim 7, wherein
   the controller is further configured to:
      identify whether the rinsing operation has been normally performed based on the value output from the optical sensor after the rinsing operation is performed.

9. The water purifier of claim 7, further comprising:
   a microorganism sensor,
   wherein the controller is further configured to:
      identify whether an additional washing operation needs to be performed based on an output from the microorganism sensor.

10. The water purifier of claim 9, further comprising:
    a discharge flow path connected to the washing water flow path and the purified water flow path; and
    a drain flow path connected to the discharge flow path,
    wherein the optical sensor is in at least one of the washing water flow path, the discharge flow path, and the drain flow path.

11. The water purifier of claim 9, further comprising:
    a discharge flow path connected to the washing water flow path and the purified water flow path; and
    a drain flow path connected to the discharge flow path,
    wherein the microorganism sensor is in at least one of the discharge flow path and the drain flow path.

12. The water purifier of claim 1, wherein
    the controller is further configured to:
       gradually increase a voltage that is applied to the washing water generator to adjust the value output from the optical sensor to reach a target value, according to an identification that an error has occurred in the washing operation.

13. A method for controlling a water purifier, comprising:
    opening a valve used to perform a washing operation of the water purifier;
    turning on a washing water generator configured to generate washing water including hypochlorous acid;
    sensing, by an optical sensor, a degree of generation of bubbles included in the generated washing water; and
    identifying whether an error has occurred in the washing operation based on a value output from the optical sensor.

14. The method of claim 13, further comprising:

outputting information related to the error through a display on an outer side of the water purifier, in response to identifying that the error has occurred in the washing operation.

15. The method of claim 13, further comprising:
transmitting, through a communicator, information related to the error to an external server or an external device that manages the water purifier in response to identifying that the error has occurred in the washing operation.

16. The method of claim 13, further comprising:
sensing a current flowing through the washing water generator with a current sensor; and
identifying whether an error has occurred in the washing operation based on the value output from the optical sensor and the current sensed by the current sensor.

17. The method of claim 16, wherein
the identifying of whether the error has occurred in the washing operation includes:
identifying that the washing water generator has not operated normally, in response to identifying that the value output from the optical sensor does not correspond to the current sensed by the current sensor.

18. The method of claim 13, further comprising:
performing a rinsing operation by controlling the valve, when a preset time has elapsed after the washing operation is performed;
identifying whether to finish the rinsing operation based on the value output from the optical sensor after the rinsing operation is performed; and
identifying whether an additional washing operation needs to be performed based on an output from a microorganism sensor.

19. The method of claim 13, further comprising:
gradually increasing a voltage that is applied to the washing water generator to adjust the value output from the optical sensor to reach a target value, in response to identifying that an error has occurred in the washing operation.

20. The method of claim 13, further comprising:
increasing an execution time of the washing operation in response to identifying that an error has occurred in the washing operation.

* * * * *